United States Patent
Liversidge

(10) Patent No.: US 11,989,251 B2
(45) Date of Patent: May 21, 2024

(54) RECONSTRUCTING BROWSER INTERACTION FROM SESSION DATA HAVING INCOMPLETE TRACKING DATA

(71) Applicant: QueryClick Ltd, Edinburgh (GB)

(72) Inventor: Christopher Liversidge, Edinburgh (GB)

(73) Assignee: QueryClick Ltd, Edinburgh (GB)

(*) Notice: Subject to any disclaimer, the term of this patent is extended or adjusted under 35 U.S.C. 154(b) by 397 days.

(21) Appl. No.: 17/297,996

(22) PCT Filed: Dec. 2, 2019

(86) PCT No.: PCT/GB2019/053404
§ 371 (c)(1),
(2) Date: May 27, 2021

(87) PCT Pub. No.: WO2020/109827
PCT Pub. Date: Jun. 4, 2020

(65) Prior Publication Data
US 2021/0397661 A1 Dec. 23, 2021

(30) Foreign Application Priority Data
Nov. 30, 2018 (GB) ...................................... 1819613

(51) Int. Cl.
*G06F 16/00* (2019.01)
*G06F 16/957* (2019.01)
*H04L 67/50* (2022.01)

(52) U.S. Cl.
CPC .......... *G06F 16/957* (2019.01); *H04L 67/535* (2022.05)

(58) Field of Classification Search
CPC ... G06F 16/957; H04L 67/535; H04L 67/146; H04L 67/306; H04L 43/04; H04L 69/40; G06Q 30/02; G06Q 50/01; G06Q 30/0255
See application file for complete search history.

(56) References Cited

U.S. PATENT DOCUMENTS

| 8,180,376 B1 * | 5/2012 | Merritt ................. H04W 24/10 455/457 |
| 9,003,012 B2 * | 4/2015 | Balasubramanian ........................ H04L 67/535 709/224 |

(Continued)

OTHER PUBLICATIONS

Delichatsios, S. A., et al., "Get to Know Goggle . . . Because They Know You," Ethics and Law on the Electronic Frontier, 6.805, Dec. 14, 2005, pp. 1-33.*

(Continued)

*Primary Examiner* — Debbie M Le
(74) *Attorney, Agent, or Firm* — Fenwick & West LLP

(57) ABSTRACT

A system for reconstructing browser interaction data from session data having incomplete tracking data is described. The system comprises: a data ingestion engine for ingesting data from a plurality of different data sources including an on-line user-interaction tracking source which provides the session data relating to different users' interaction with a website, some of the session data including tracking identifiers, and a non-interaction tracking source for providing non-session data relating to user activity other than session data; a data store for storing the ingested data; a data cleansing engine for cleansing the ingested data, the data cleansing engine comprising: a data re-evaluation engine for evaluating the non-session data and recovering user identifiers within the non-session data; and a path view building engine for linking together session data from different user (Continued)

interaction sessions to form linked session data using the tracking identifiers within the session data; wherein the data re-evaluation engine is arranged to compare the recovered user identifiers from the non-session data with user identifiers associated with the session data, and to associate any unlinked session data not previously linked with the linked session data, with linked session data which has an association via the recovered user identifiers, and wherein the path view building engine is arranged to link together any unlinked session data with linked session data having an association via the recovered user identifiers.

16 Claims, 18 Drawing Sheets

(56) References Cited

U.S. PATENT DOCUMENTS

| | | | |
|---|---|---|---|
| 9,203,905 B1 | 12/2015 | Hong et al. | |
| 9,213,990 B2* | 12/2015 | Adjaoute | G06Q 20/12 |
| 10,334,101 B2* | 6/2019 | Gluck | H04M 3/42221 |
| 2010/0169177 A1* | 7/2010 | Griffith | G06F 16/958 |
| | | | 709/224 |
| 2013/0124309 A1 | 5/2013 | Traasdahl et al. | |
| 2014/0189519 A1* | 7/2014 | Powell | H04L 67/535 |
| | | | 715/736 |
| 2017/0323361 A1* | 11/2017 | Giró | G06Q 30/0629 |

OTHER PUBLICATIONS

PCT International Search Report and Written Opinion, PCT/GB2019/053404, dated May 20, 2020, 9 Pages.

European Patent Office, European Examination and Written Opinion, European Patent Application No. 19845774.9, dated Sep. 8, 2023, 8 pages.

Paulsen, T. "Build Your Own Cross-Device Marketing Attribution with Apache Spark and R," trevorwithdata.com, Jan. 15, 2018, 9 pages, Retrieved from the internet <URL:https://trevorwithdata.com/attribution-theory-cross-device-marketing-attribution-with-apache-spark-and-r/>.

* cited by examiner

| Cookie ID | Visit Number | UserID | PurchaseID |
|---|---|---|---|
| co1 | v1 | | |
| co1 | v2 | cl1 | |
| co1 | v3 | cl1 | p1 |
| co2 | v1 | | |
| co2 | v2 | cl2 | |
| co1 | v4 | | |
| co1 | v5 | cl2 | p2 |
| co2 | v4 | cl1 | p3 |

Figure 10A

| Purchase | Path | UserID |
|---|---|---|
| p1 | (co1,v1),(co1,v2),(co1,v3) | cl1 |
| p2 | (co1,v1),(co1,v2),(co1,v3),(co2,v1),(co2,v2),(co1,v4),(co1,v5) | cl2 |
| p3 | (co1,v1),(co1,v2),(co1,v3),(co2,v1),(co2,v2),(co1,v4),(co1,v5),(co2,v4) | cl1 |

Figure 10B

| Purchase | Path | UserID |
|---|---|---|
| p1 | (co1,v1),(co1,v2),(co1,v3) | cl1 |
| p2 | (co1,v1),(co1,v2),(co1,v3),(co2,v1),(co2,v2),(co1,v4),(co1,v5) | cl2 |
| p3 | (co2,v1),(co2,v2),(co2,v4) | cl1 |

| Dimension 1 (lossless) | Dimension 2 (lossy) | ... | Dimension N | Visits/day |
|---|---|---|---|---|
| 1A | 2A | ... | NA | 1.000.000 |
| 1B | 2B | ... | NA | 50.000 |
| ... | ... | ... | ... | ... |
| 1A | 2B | ... | NA | 3 |
| 1A | 2C | ... | NB | 1 |
| 1A | 2B | ... | NC | 1 |

Figure 13B

| Dimension 1 (not to be aggregated) | Dimension 2 (to be aggregated) | ... | Dimension N | Visits/day |
|---|---|---|---|---|
| 1A | 2A | ... | NA | 1.000.000 |
| 1B | 2B | ... | NA | 50.000 |
| ... | ... | ... | ... | ... |
| 1A | Other | ... | Other | 5 |

RECONSTRUCTING BROWSER INTERACTION FROM SESSION DATA HAVING INCOMPLETE TRACKING DATA

FIELD OF THE INVENTION

The present invention relates to a system and method of reconstructing browser interaction from session data having incomplete tracking data.

BACKGROUND

User interaction with websites can be in many different ways. For example, a user can interact with a website from different devices and different locations, and the same device can be used by multiple different users for example a shared home computer or one in an internet café.

A suit of tools have been developed by companies such as Google Analytics (GA) and Adobe Analytics (AA) which seek to measure, collect, analyse and report on the usage of a website by various visitors. The data is usually collected in the form of a plurality of user sessions with one session covering a visit to the website by a user and their interaction with the pages of the website during that visit. The mechanism used to collect the data is by the use of identifiers such as internet cookies, device identifiers and user identifiers. These tools have attempted to address the problem of the same user interacting with the website from different devices by use of device identifiers and processes such as 'stitching', see for example www.e-nor.com/blog/google-analytics/advanced-session-stitching-and-cross-device-attribution-using-custom-dimensions-in-google-analytics.

Whilst such stitching together of session data for a given user does help to increase the amount of data associated with user navigation and interaction with a website over different sessions, there is still a vast amount of session data which is not able to be associated to the correct user and as such is considered to be from a different user. This inability to correctly associate session data with the correct user distorts any analytics and analysis carried out on the session data and can lead to incorrect corrective actions on the website being taken as a result.

Attempts to mitigate this problem have been pursued using probability theory for example as shown in U.S. Pat. No. 9,660,880. However, the problem with these approaches is that they are effectively based on confidence levels of the session data belonging to a particular user rather than a specific knowledge from the session data that the session data belongs to that user. Accordingly, such probabilistic methods always have a degree of error associated with them as they can never be 100% accurate.

Furthermore, the session data is sometimes incomplete or has errors in it which makes the analytical process provide less than optimum results for both the conventional stitching techniques and the probabilistic methods. For example some browsers will actively block cookies and other identifiers (IDs) from being placed on the user device/browser which means that session data cannot be stitched with other session data from the same user and also vital analysis information is missing from that data which prevents any form of meaningful analysis from being carried out.

The present invention seeks to overcome at least one of the above described problems.

SUMMARY OF THE INVENTION

According to one aspect of the present invention there is provided a system for reconstructing browser interaction data from session data having incomplete tracking data, the system comprising: a data ingestion engine for ingesting data from a plurality of different data sources including an on-line user-interaction tracking source which provides the session data relating to different users' interaction with a website, some of the session data including tracking identifiers, and a non-interaction tracking source for providing non-session data relating to user activity other than session data; a data store for storing the ingested data; a data cleansing engine for cleansing the ingested data, the data cleansing engine comprising: a data re-evaluation engine for evaluating the non-session data and recovering user identifiers within the non-session data; and a path view building engine for linking together session data from different user interaction sessions to form linked session data using the tracking identifiers within the session data; wherein the data re-evaluation engine is arranged to compare the recovered user identifiers from the non-session data with user identifiers associated with the session data, and to associate any unlinked session data not previously linked with the linked session data, with linked session data which has an association via the recovered user identifiers, and wherein the path view building engine is arranged to link together any unlinked session data with linked session data having an association via the recovered user identifiers.

The recovered user identifiers may comprise a first and a second different user identifiers and the data re-evaluation engine is arranged to associate the first user identifier with the linked session data and the second user identifier with the unlinked session data.

The recovered user identifier may comprise a hashed user identifier. In some embodiments the hashed recovered user identifier comprises a hashed-mail address, hashed postcode or hashed payment details.

The data re-evaluation engine may obtain a first user identifier from the session data and create a hashed version of the first user identifier for comparison with the hashed recovered user identifier.

In some embodiments the data re-evaluation engine determines the probability of some session data leading to a predetermined event, and removes some of the session data from the linked session data, if the probability is below a predetermined threshold. This filtering can help to reduce very long chains of session data relating to user interaction to make any data analysis for that session data less complex and hence quicker and more accurate.

The session data or non-session data can comprise so called 'messy' data, the messy data having a data structure not matching a data structure known to the system. The data cleansing engine can in some embodiments advantageously be arranged to add structure to the messy data to enable the messy data to be understood by the system.

The data cleansing engine can be arranged to consider the session data received from the data ingestion engine and to generate an error signal for communication back to the website, if the number of errors exceeds a predetermined limit or the session data lacks sufficient structure to be considered.

The data cleansing engine can be arranged to consider the session data and a plurality of predetermined dimensions and assign a plurality of dimensions to the session data matching that session data.

The data cleansing engine can be arranged to review historic session data to identify a plurality of dimensions to apply to the session data.

The data cleansing engine may comprise a neural network for comparing patterns of session data with patterns of historic session data associated with a known dimension, and assigning the known dimension to the session data where the corresponding patterns match.

Where the session data comprises dimension information determined externally to the system, the data cleansing engine can be arranged to replace externally-generated dimension information with one of more of the plurality of predetermined dimensions.

The system may further comprise a segmentation engine for grouping together the session data into segments based on the plurality of dimensions applied to that session data. The segmentation engine can be arranged to use combinations of dimensions which are associated with a particular type of data analysis.

The system can be arranged to define a segment as a particular combination of dimensions and some of the plurality of dimensions as lossy, and the segmentation engine can be arranged to combine the lossy dimensions to reduce the number of different combinations of segments to be considered by the segmentation engine.

Preferably, the segmentation engine is arranged to use the historic session data to determine the historic probability of use of each segment, and the segmentation engine further comprises a table compression engine for creating a compressed table which combines together segments having a low historic probability of use as determined from the historic session data.

The segmentation engine is preferably arranged to apply the session data to the compressed table to correctly segment the session data using a plurality of dimensions.

The data ingestion engine can be arranged to ingest data from an analytics platform as clickstream data. Also the ingestion engine can be arranged to ingest non-session data from a CRM platform, or a social media website or off-line data from a data store.

The system preferably further comprises a processor for processing the cleaned and segmented data and an event prediction neural network. The processor can be arranged to apply the cleaned and segmented data to the neural network to determine the likelihood of occurrence of a predetermined user interaction event with the website.

According to another aspect of the present invention there is provided a method of reconstructing browser interaction data from session data having incomplete tracking data, the method comprising: ingesting data from a plurality of different data sources including an on-line user-interaction tracking source which provides the session data relating to different users' interaction with a website, some of the session data including tracking identifiers, and a non-interaction tracking source for providing non-session data relating to user activity other than session data; storing the ingested data; cleansing the ingested data, the cleansing step comprising: evaluating the non-session data and recovering user identifiers within the non-session data; and linking together session data from different user interaction sessions to form linked session data using the tracking identifiers within the session data; wherein the evaluation step comprises comparing the recovered user identifiers from the non-session data with user identifiers associated with the session data and associating any unlinked session data not previously linked with the linked session data, to linked session data which has an association via the recovered user identifiers, and the linking step comprises linking together any unlinked session data with linked session data having an association via the recovered user identifiers.

In some embodiments, the recovered user identifiers comprise a first and a second different user identifiers and the evaluating step comprises associating the first user identifier with the linked session data and the second user identifier with the unlinked session data.

In other embodiments, the recovered user identifiers include a hashed user identifier and the evaluating step comprises obtaining a first user identifier from the session data and creating a hashed version of the first user identifier for comparison with the hashed recovered user identifier.

In one embodiment, the evaluating step comprises determining the probability of some session data leading to a predetermined event, and removing some of the session data from the linked session data, if the probability is below a predetermined threshold.

Furthermore, it is to be appreciated that the above-described features of the system for reconstructing browser interaction data from session data having incomplete tracking data embodying the present invention can also be realised as features of the above-described method of reconstructing browser interaction data from session data having incomplete tracking data.

The present embodiments also extend to a computer-readable storage medium comprising instructions which, when executed by a computer, cause the computer to carry out the above-described method.

The present embodiments are directed to taking 'session-led digital analytics' and use machine learning to transform these into 'user-led analytics'. This is primarily achieved through two key processes, namely data cleansing and data segmentation. As has been mentioned above, using non-session data is important to address the problems of session data having incomplete tracking data. However, using non-session data such as CRM data can sometimes be challenging. For example CRM data, for example marketing data, can cause difficulty because marketing campaign data is typically poorly structured, not conforming to any standard, and so is difficult to derive useful information from. The present embodiments can clean and segment this data to make it useful.

In an embodiment of the present invention session data is converted into a single customer journey data which may span several sessions at the same website over a longer period of time and this can give different insights into customer behaviour (the customer remains anonymous as they are only identified using cookies placed on the customer's browser rather than their actual identity).

Once the raw data is available, one of the most valuable aspects of the present embodiments can be realised. Using a machine learning processing and data analysis, the raw data is cleansed prior to being processed. This can have several benefits.

The present embodiments can enable the accuracy and quality of the raw data which is being generated at a website can be evaluated. One benefit of this task, is to effectively audit the manner in which a current website has set up its website tracking functionality. It can be difficult to derive value from tracking data without effective tracking and so by cleansing from the source (namely the website session data recordal), improvements in the generated raw data can advantageously be realised.

In the present embodiments the data cleansing is automated and, with such vast amounts of data which are being generated, machine learning can used to identify areas of concern and to cleanse the data. This takes the form of anomaly identification, where the raw data is processed and the system looks for abnormalities.

Raw data of poor quality is often bucketed to default channels, leaving large pools in inaccurate data skewing processing results. To combat this, the system of the present embodiments can re-evaluate the data to improve the accuracy by finding a 'best fit' channel to help remove the default.

During the cleansing process of the present embodiments, the individual touchpoints of Clickstream data, which are ordered in sessions, can be stitched into the user view. Taking a number of completely separate sessions and combining them into a longer term, valuable view of a user's lifespan with the website. This 'path view' building is based on a custom IDs collected from the cookie of a user on the website. All individual sessions can then be considered for combination and ordering to show the entire user interaction path. For further accuracy and to overcome missing tracking data, other unique identifiers, such as hashed email addresses, or potentially any other user identifier can also be combined.

BRIEF DESCRIPTION OF THE DRAWINGS

In order that the present invention may be more readily understood, reference will now be made, by way of example, to the accompanying drawings in which:

FIG. 10A is a table showing an example of information about session data received from an Analytics Platform of FIG. 1;

FIG. 10B is a table showing the results of applying a Household Strategy of the Path View Building Engine of FIG. 8 to the table of information about session data of FIG. 10A;

FIG. 10C is a table showing the results of applying a Customer Strategy of the Path View Building Engine of FIG. 8 to the table of information about session data of FIG. 10A;

FIG. 13A is a table showing a non-aggregated table of segments of historic data, which are subdivided into the dimensions to illustrate the method of operation shown in FIG. 12;

FIG. 13B is a table showing an aggregated table of segments of historic data, which are subdivided into the dimensions to illustrate the method of operation shown in FIG. 12;

DETAILED DESCRIPTION OF EXEMPLARY EMBODIMENTS

Figure 1:
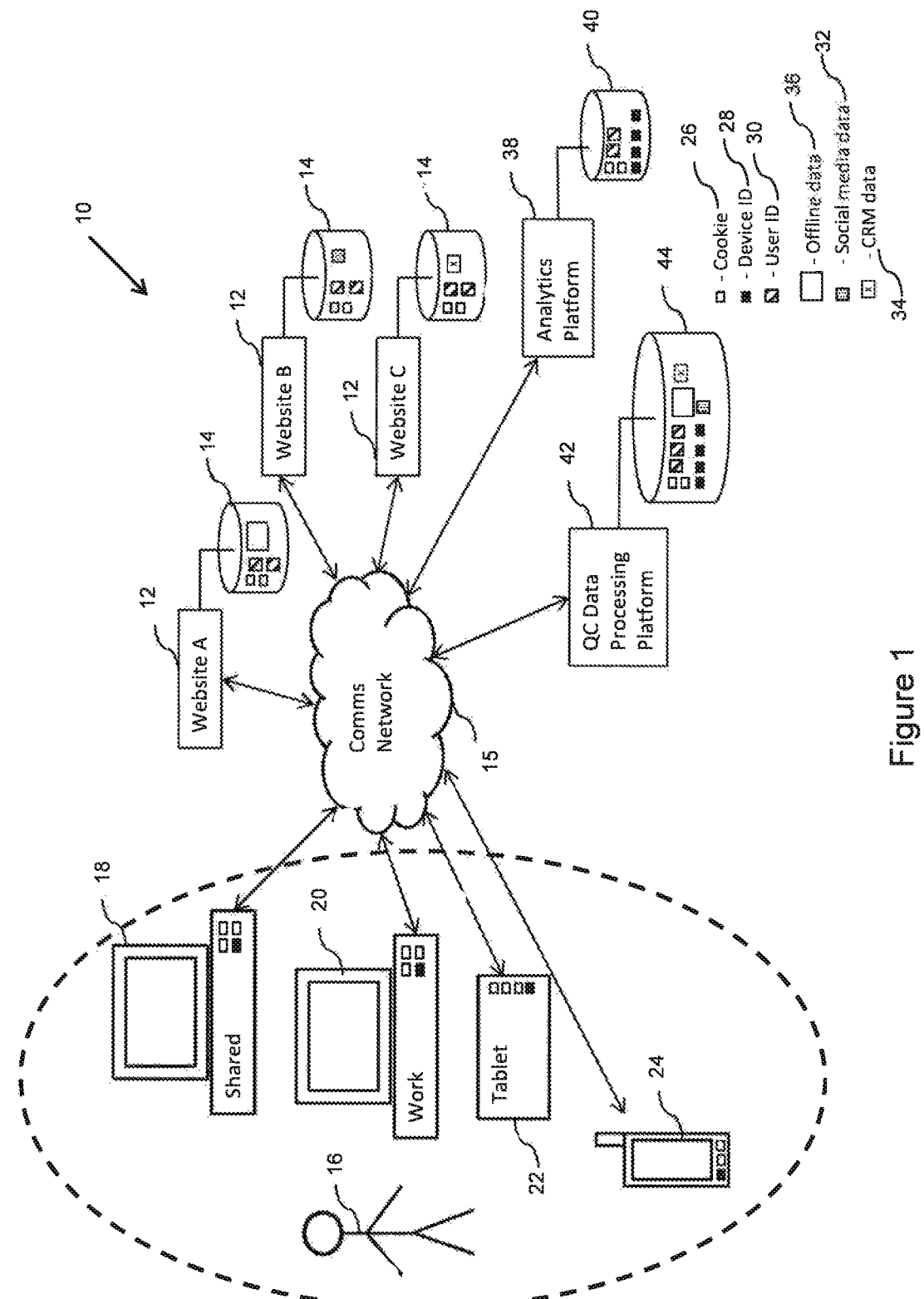
FIG. 1 is a schematic block diagram showing an Internet environment and an embodiment of the present invention operating within that environment.

Referring to FIG. 1 there is shown an environment 10 in which an embodiment of the present invention operates. The environment is that of the Internet with three different websites 12 (hosted on web servers) are shown each having its own local data store 14 and accessible via a communications network 15. It is to be appreciated that three websites are shown by way of example and there are over a billion websites actually available for a user to interact with. Each website is accessible to a user through use of an Internet browser (not shown) such as Internet Explorer® or Google Chrome® for example. A respective browser is provided on different devices that a user can have access to. In the present embodiment of the environment, the user 16 has access to the websites 12 via a shared computer 18, possibly at home or in an Internet café, via a work computer 20, via a personal tablet computer 22 and also via a mobile device 24 such as a smartphone. Each of these devices has a unique machine identifier (Device ID 28) which can be read by the website 12 and also has one or more cookies 26, namely simple text files that are website-specific and which store user-interaction information about visits to a particular website from the browser on that specific device.

The websites 12 themselves record user interaction of each visit of a user to the website as session data. A session persists only for as long as a user is interacting with the website and can end if a user navigates away from the website or does not provide any further interaction for a period of time (timeout of session). Accordingly, a website 12 collects huge amounts of session data which is linked to each visit by a user. This is valuable feedback data which enables the website 12 to determine using website analytics how well the website 12 is working and to improve its functionality. However, one key aspect to analysing the data is to be able to attribute different session data to the same user such that a better picture of the user interaction can be built up. In addition to the limited number of known ways in which different session data can be attributed to the same user (data stitching—as described in the background to the invention), the present embodiment can utilise other data (non-session data), for example not directly relating to user interaction with the website 12, to recover more session data and attribute it to the same user than has been possible before. This is described in greater detail later.

The websites 12 also store the corresponding cookies 26 (or at least information enabling them to identify the user 16 and device using the cookie). They also store the unique machine identifiers (Device IDs) 28 to identify a device which is being used. Accordingly, these identifiers 26, 28 (in combination sometimes referred to as a Client ID) can be used to associate the same user 16 with different session data, in many cases using the assumption that the same user uses the same device having the same browser to access a website 12. Also on some websites 12, a user may make a purchase and typically this requires the user 16 to register their details and identify themselves and create a website-specific User ID 30. This User ID 30 can also be used to identify the user 16 and link together otherwise unconnected session data where the same User ID 30 has been used in both sessions but perhaps with different Device IDs (identifiers).

Accordingly, one user may have multiple different cookies identifying them to the website. However from this machine identity (Device ID 28) and cookie data (cookie 26) alone, the website 12 does not know that the different devices 18, 20, 22, 24 are being used by the same user 16 to access the website 12. Furthermore, if multiple users are using the same device and the same browser, then the combining session data using the Client ID (26, 28) alone can be inaccurate as they may relate to different users.

The user can also have other identifiers present in their non-session data within the on-line domain such as social media data 32 which can be stored as a result of user interaction with a website 12. The data source may have a corroborating ID between the social media domain and the website, and the data stored may include email addresses, IP addresses, postcodes, etc. which are typically only available in a hashed form to external systems.

Also other information which can be used to generate user interaction with the website (such as a marketing campaign in a CRM system) can store user interaction data 34 with the website. Other off-line data 36 can also be present in the data stores 14 of websites 12 which can for example represent a marketing campaign or some other form of user interaction data. Another specific example of other offline data 36 can be seen in store receipts (sales receipt data) stored on an internal database of a retailer. This is data that a Point of Sale (POS) system generates when customers purchase goods which are then associated with the user for example via a loyalty card scheme or a user's email address (for example to validate warrantees etc.). This store receipt data includes within it the user identifiers within a specific domain. In the environment of the present embodiment for example, Website A 12 has stored off-line data 36, Website B has stored social media data 32 and Website C 12 has stored CRM data 34.

The present environment 10 also includes a Web Analytics Platform 38 which can receive session data and store the same in its local data store 40. The Web Analytics Platform 38 processes this data together with website cookies 26, Device IDs 28 and User IDs 30, to associate different sessions with a specific user 16 and thus derive useful user behaviour information. The Analytics Platform 38 may receive the session data in the form of clickstream data (namely data that lists the sequences of pages visited by the users on the webpages of the website, namely their paths and their interaction with each webpage) from the website without any of the data having been processed in any way. Alternatively the Web Analytics Platform 38 may receive the session data in a form which has already been processed by the website 12, for example by hashing various user identifying data, such as their postcode. The Web Analytics Platform 38 also has a data store 40 for storing the received cookies 26, Device IDs 28 and User IDs 30. The Analytics Platform 38 provides a result of the analysis to the website 12 for consideration.

There is also provided a QC Data Processing Platform 42 which is connected to the communications network 15 and can receive data sent to it from the websites 12 or from the Web Analytics Platform 38 or can pull non-session data 32, 34, 36 stored at a website 12 or elsewhere. This data (referred to as raw data) once received, is stored in a Data Store 44 connected to the QC Data Processing Platform 42. It is to be appreciated that the Data Store 44 has been shown locally positioned to the QC Data Processing Platform. However, this is merely a schematic representation as the data storage is typically cloud storage. For example any cloud storage provider (Microsoft Azure®, Amazon AWS® Google Cloud Storage® etc.) could be used to provide the Data Store 44 and this enables the storage to be scalable and flexible. The QC Data Processing Platform 42 acts to analyse the data and generate an analytics report in one embodiment, though it can also generate feedback control commands in other embodiments. In order to do this the session data and other raw data from these different sources needs to be pre-processed to ensure that as much of the session data can be attributed to the same user 16 as possible to prevent the analysis from considering the same user's different interactions with a website 12 as being considered as belonging to different users. The pre-processing also needs to take into account that some data may be missing from the raw data recorded or provided by the website 12. Also the QC Data Processing Platform 42 takes account of the fact that different websites 12 record data in different ways and so even complete data may not provide certain information. For example, not all websites 12 provide a User ID 30 they may provide this in the form of a Purchase ID, namely an identifier that identifies a specific significant action which occurred on the website, for example a purchase.

Figure 2:
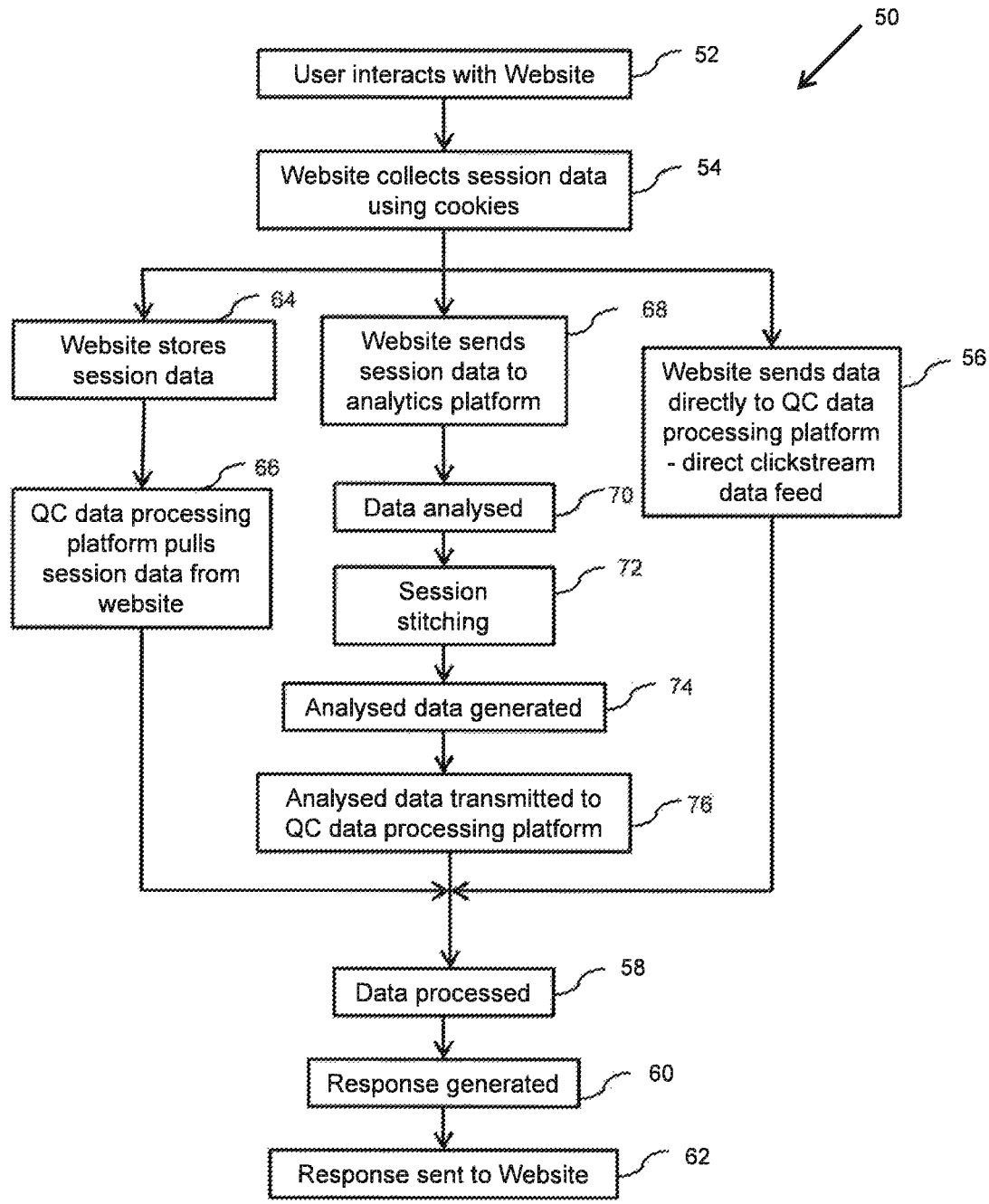
FIG. 2 is a flow diagram showing a method of operation of the embodiment of FIG. 1.

Referring now to FIG. 2, a method 50 of data collection and analysis within the environment 10 set out above in relation to FIG. 1, is now described. The method 50 commences with the user 16 interacting, at Step 52, with a website 12. The interaction can be in the form of user navigation over different pages, using different functionality provided on the website, such as chat pop-up windows, products viewed, products added/removed from basket, purchases and abandoned purchases, for example. These user interactions are recorded, at Step 54, as session data and this also includes the use of cookies 26 placed on the user's device 18, 20, 22, 24 for providing user interaction data. Once the data from multiple sessions involving multiple users has been collected, and this can involve millions of individual data points each day, the data can be handled in one of three ways. Firstly, the website 12 can send, at Step 56, the session data directly to the QC Data Processing Platform 42 as a direct clickstream data feed. (In an alternative embodiment, this raw website session data can be sent via a specific analytics platform (not shown) which converts the raw data into a clickstream to be sent onto the QC Data Processing Platform 42 in a form understandable to the QC Data Processing Platform). Once the session data has been received, it can be processed, at Step 58 (as will be described in detail later), and an analytics response generated, at Step 60. The response (results of the analysis) can then be used to take some action or simply be sent, at Step 62, back to the website 12 for further analysis.

Secondly, in place of the website sending, at Step 56, the data directly to the QC Data Processing Platform 42, the data can be stored, at Step 64, locally at the data store 14 of the website 12 and subsequently, the QC Data Processing Platform 42 can pull, at Step 66, the session data from the website data store 14. The process 50 then continues with the data processing, response generation and response provision steps (Steps 58, 60 and 62) as described previously.

Thirdly, as alternative to the above two options for providing the session data to the QC Data Processing Platform 42, the website 12 can send, at Step 68, the session data directly to the Analytics Platform 38 for example as a direct clickstream data feed. The Analytics Platform 38 then performs, at Step 70, analysis on the data. As part of that analysis, some of the session data may be stitched together, at Step 72, as has been described previously. The output of the process is analysed data, which is generated, at Step 74 and, in this case, is in a form understandable by the QC Data Processing Platform 42. However, as has been mentioned previously, this analysed data is based the ability the Analytics Platform 38 has to attribute different session data to the same user 16 to provide a more accurate picture of user interaction. As this is session stitching can only stitch some of the session data together the process is sub-optimal. This stitched data is sent, at Step 76, as a data stream to the QC Data Processing Platform 42 for further processing. A simple permission granting process or service account set up is all that is required for the Analytics Platform 38 to send the clickstream data to the QC Data Processing Platform 42. The process 50 then continues with the data processing, response generation and response provision steps (Steps 58, 60 and 62) as described previously.

It is also to be appreciated that the QC Data Processing Platform 42 retrieves non-session data from the data stores 14 of websites 12 and other locations (not shown). The non-session data includes previously described social media data 32, CRM data 34 and offline data 36. This non-session data 32, 34, 36 is used to aid in the data processing, at Step 58, to effectively improve the recovery of data from the session data stream which may be considered to either not be useable (because it has previously had all tracking information stripped from it) or is not assigned to the correct user 16.

Figure 3:
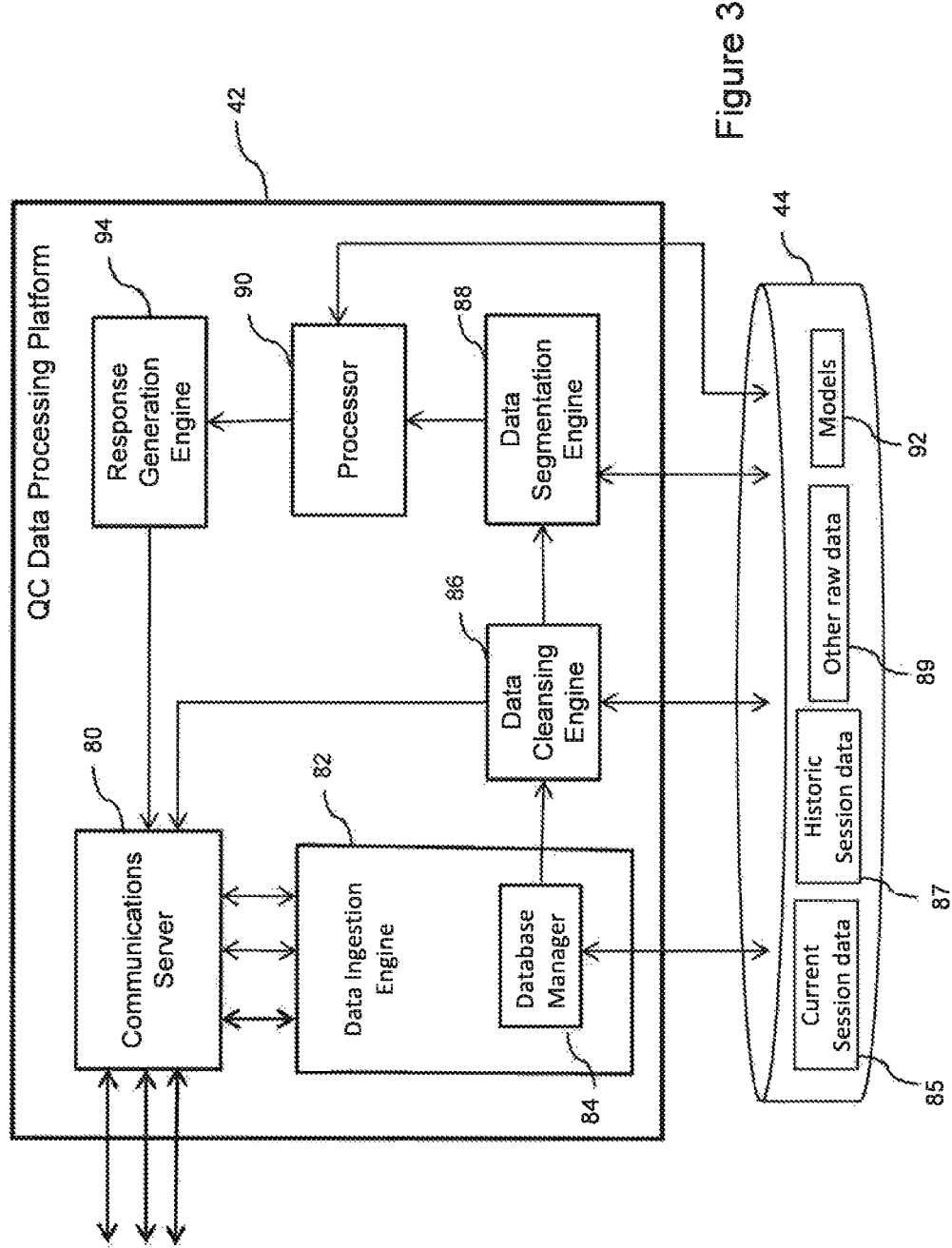
FIG. 3 is a schematic block diagram showing a QC Data Processing Platform of the embodiment shown in FIG. 1.

The QC Data Processing Platform 42 is now described in greater detail with reference to FIG. 3, where its constituent components are shown. The QC Data Processing Platform 42 comprises a Communications Server 80, which communicates with websites 12 and the Analytics Platform 38 via the communications network 15. The Communications Server 80 is comprised of standard components and so is not described in further detail herein. Data received at the Communications Server 80 is provided to a Data Ingestion Engine 82 which acts to obtain the session data from different sources with the appropriate data retrieval mechanism, whether that be push or pull mechanisms direct or indirectly from the source (as will be described in greater detail later). The received current session data 85 is firstly provided to a Database Manager 84 provided as part of the Data Ingestion Engine 82 for storage to a database (not shown) within the Data Store 44. Typically, up to two-years worth of session data is recorded for a given website 12 as historic session data 87 to provide a deep source of data from which to draw learning for the subsequent analysis on the current session data. In other embodiments, less historic data 87 can be stored, with a minimum of three months of historic data being required. However in the present embodiment, the use of a longer period of historic data 87 for later analysis has been found to be highly beneficial to results. So the received current session data 85 is stored itself for analysis but is also added to the historic session data 87 for that website 12 by the Database Manager 84 and also is passed onto a Data-Cleansing Engine 86. The Data-Cleansing Engine 86 acts to clean the current session data 85 and uses the stored collaborating Other Raw Data 89 to clean and structure both session data and the other data in to so called 'dimensions' as will be described in detail later. However, if the Data-Cleansing Engine 86 cannot understand the received session data or cannot cleanse the session data, the Data-Cleansing Engine 86 is connected to the Communications Server 80 to indicate this and send a message to the source of that data to try to improve the quality of the session data being sent. For any current session data 85 that can be cleaned, this is then forwarded to a Data Segmentation Engine 88 which segments the session data using the one or more specific dimensions, typically a plurality of dimensions, to realise the maximum benefits of the QC Data Processing Platform 42 and then the data is passed to a Processor 90 coupled to the Data Segmentation Engine 88. The Processor 90 has access to data models 92 stored in the Data Store 44 for use in the analysis of the data to better understand issues such as attribution. The Processor 90 carries out the analysis and the results of this process are sent to a Response Generation Engine 94, which prepares an appropriate response as a consequence of the results. The generated response is sent to the website 12 via the Communications Server 80 and the Communications Network 15.

The response can take many different forms from a report on the performance of the website 12, to instructions for changing an aspect of the configuration of the website 12 to mitigate a problem detected via the analysis. The response can also be a control signal to instruct the website 12 to automatically change its configuration to mitigate a problem, for example to migrate a website to a different server in view of traffic problems detected via the analysis.

Figure 4:
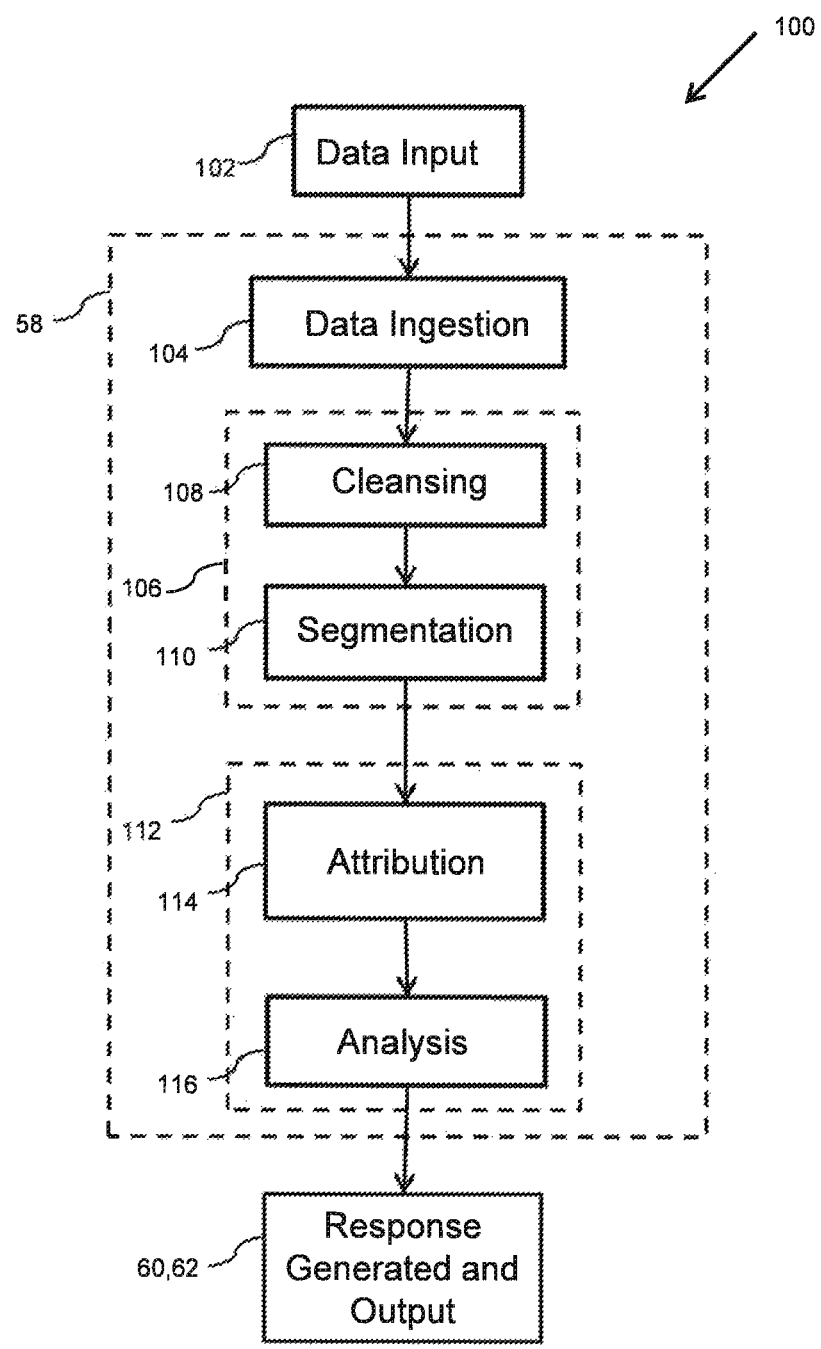
FIG. 4 is a schematic block diagram showing a method of operation of the QC Data Processing Platform of FIG. 3.

Referring now to FIG. 4, a method 100 of operation of the QC Data Processing Platform 42 is now described. The method 100 commences with raw data being input, at Step 102, to the QC Data Processing Platform 42. This manner of data input can take many different forms, with three different ways having been described above with reference to FIG. 2. The precise manner in which the session data and other corroborating raw data are obtained and the plurality of different channels which are used is determined and controlled by the Data Ingestion Engine 82.

Once the session data 85 and other raw data 89 relating to the session data 85 has been received, it is processed, at Step 58. More particularly, the processing at Step 58, involves a first stage of data ingestion at Step 104 which obtains the session data 85 including cookies 26, Device IDs 28 and User IDs 30, other relevant corroborating raw data 89 (also referred to as non-session data) such as social media data 32, CRM data 34 and off-line data 36 and stores the data in the Data Store 44 in the form of current session data 85, historical session data 87 and other raw data 89. It is to be appreciated that the other raw data 89 may also be segmented into current and historical parts for use later. The current session data 85 is then put through a pre-processing process, at Step 106, which involves preparing the session data for correct processing. The pre-processing, at Step 106, involves two stages: namely a cleansing process, at Step 108, and a segmentation process, at Step 110. The cleansing, at Step 108, effectively removes obvious errors in the data and puts a structure to the data which enables the session data to be better understood. Also the cleansing Step 108, puts the structured data into useful areas and takes care of trying to attribute different session data to a single user particularly session data which cannot, by conventional use of User IDs 30, Device IDs 28 and cookies 26, be linked to the correct user. The cleansing step 108 uses the corroborating other raw data 89 (namely the off-line data 36, CRM data 34 and social media data 32) to assist in identifying more of the current session data 85 which should be attributed to a specific existing user rather than to assume that this session data 85 represents a new user interaction with the website 12 being considered. This is described in greater detail later with reference to FIGS. 7A, 7B and 7C.

The segmentation, at Step 110, involves regrouping the cleansed and structured data into a form which permits multi-dimensional analysis to be carried out efficiently. This regrouping greatly improves the speed at which subsequent data analysis can be carried out and greatly increases the volume of data that can be considered in any analysis. Furthermore, by use of multi-dimensional analysis, the accuracy of the results is vastly improved. The segmentation, at Step 110, is described in greater detail later with reference to FIG. 9.

Once the data has been correctly cleansed, segmented and regrouped, it is passed to the Processor 90 where it is it processed, at Step 112. The processing step 112, involves trying to extract meaning from the cleaned and structured data, namely data analytics. The two main stages of processing in the present embodiment are Attribution, at Step 114, (namely analysis for the touchpoints and browsing paths for users when determining whether or not they will take an action such as committing to a purchase on a website (so called 'conversion')) and subsequent Analysis, at Step 116, which may determine what actions to recommend as an outcome of the Attribution analysis, at Step 114. It is to be appreciated that knowledge of the type of analysis is to be carried out can determine some of the dimensions which the cleansing, at Step 108, is looking for in the session data to make the processing, at Step 112, more effective. This is described in greater detail later.

Figure 5:
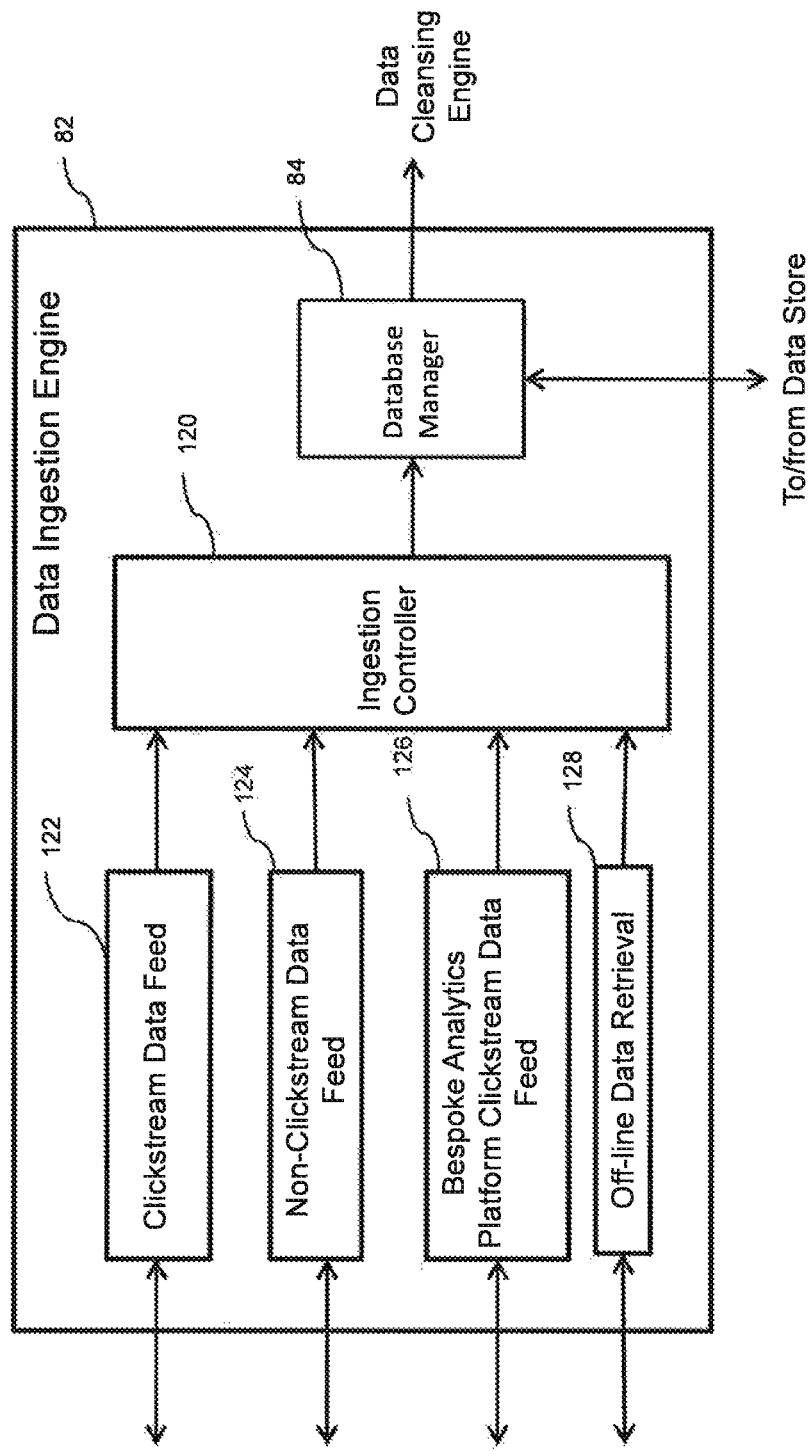
FIG. 5 is a schematic block diagram showing a Data Ingestion Engine of the QC Data Processing Platform of FIG. 3 in greater detail.

Referring now to FIG. 5, the Data Ingestion Engine 82 is shown in greater detail. The Data Ingestion Engine 82 is primarily controlled by an Ingestion Controller 120 which coordinates the operation of various different data input streams into the QC Data Processing Platform 42. In the present embodiment, four different data streams are shown (though in other embodiments more or less data streams can be provided). More specifically, the Data Ingestion Engine 82 comprises a Clickstream Data Feed Module 122, which takes as an input either clickstream data directly from the website 12 or clickstream data from the Analytics Platform 38. The Clickstream Data Feed Module 122, using the Ingestion Controller 120, sets up a communications channel between the QC Data Processing Platform 42 and the Analytics Platform 38 or the website 12. Subsequently, the direct clickstream data feed module 122, receives a data clickstream output (session data 85) for a given website 12 directly from the Analytics Platform 38 or the website 12 and passes this to the Database Manager 84 for storing in the Data Store 44. The same current session data 85 in the form of a clickstream is passed to the Data Cleansing Engine 86.

The Data Ingestion Engine 82 also comprises a Non-Clickstream Data Feed Module 124, which takes as an input raw data (non-session data) which can be used to corroborate a user of session data. For example, the Non-Clickstream Data Feed Module 124 can obtain CRM data 34 and social media data 32 from the websites 12. The Non-Clickstream Data Feed Module 124, using the Ingestion Controller 120, sets up a communications channel between the QC Data Processing Platform 42 and the websites 12 (in this embodiment), for the non-clickstream data ingestion and once this data has been received it is passed onto the Database Manager 84 for storing in the Data Store 44.

The Data Ingestion Engine 82 also comprises a Bespoke Analytics Platform Clickstream Data Feed Module 126, which takes as an input clickstream data provided by a bespoke analytics platform (not shown), which supports the data formats used by the QC Data Processing Platform. The bespoke analytics platform would obtain its data from user interaction with the website 12 through use of a tracking pixel which would be embedded within the webpage and which would fire providing data to the bespoke analytics platform with certain user interaction. The Bespoke Analytics Platform Clickstream Data Feed Module 126, using the Ingestion Controller 120, sets up a communications channel between the QC Data Processing Platform 42 and the bespoke analytics platform, for the clickstream data ingestion and once this data has been received it is passed onto the Database Manager 84 for storing in the Data Store 44 and for provision to the Data Cleansing Engine 86.

The last type of data stream supported by the Data Ingestion Engine 82 is that for off-line data 36 collection, namely collection of the other form of non-session data. The Data Ingestion Engine 82 comprises an Off-Line Data Feed Module 128, which takes as an input raw off-line data 36, which can be used to corroborate a user 16 of session data. For example, the Off-Line Data Feed Module 128 can obtain the off-line data 36 from a website 12. The Off-Line Data Feed Module 128, using the Ingestion Controller 120, sets up a communications channel between the QC Data Processing Platform 42 and the website 12, for the off-line data ingestion and effectively pulls the off-line data 36 from the Data Store 14 to the Ingestion Engine 82. Once this off-line data 36 has been received it is passed onto the Database Manager 84 for storing in the Data Store 44.

So the Ingestion Engine 82 is arranged to ingest data from different sources as well as the website 12 which is being analysed. Offline data 36 can be provided by webhooks into analytics systems so the system can ingest it, as is the case with clickstream data. Also the Ingestion Engine 82 can be configured to receive regular data dumps from websites 12 in several different ways. Alternatively, the Ingestion Engine 82 can be given access to a data store 14 of off-line data and can actively retrieve it.

The QC Data Processing Platform's ability to link other data sources 32, 34, 36 with what can be tracked on a website 12 will vary also. The data source may have a corroborating ID between social media and the website, and the QC Data Processing Platform 42 may be provided with hashed email addresses that can be matched up, hashed IP addresses, hashed postcodes, hashed payment details etc. in other data sources which can be matched to the website session data 85. In this regard the system includes a hashing function to create a hash of any user identifier obtained from the session data. Accordingly, hashed versions of any user identifier can be compared for equivalence. The hashing function is a standard function which has already been applied to non-session data obtained externally and can be applied to identifiers obtained from session data.

Figure 6:
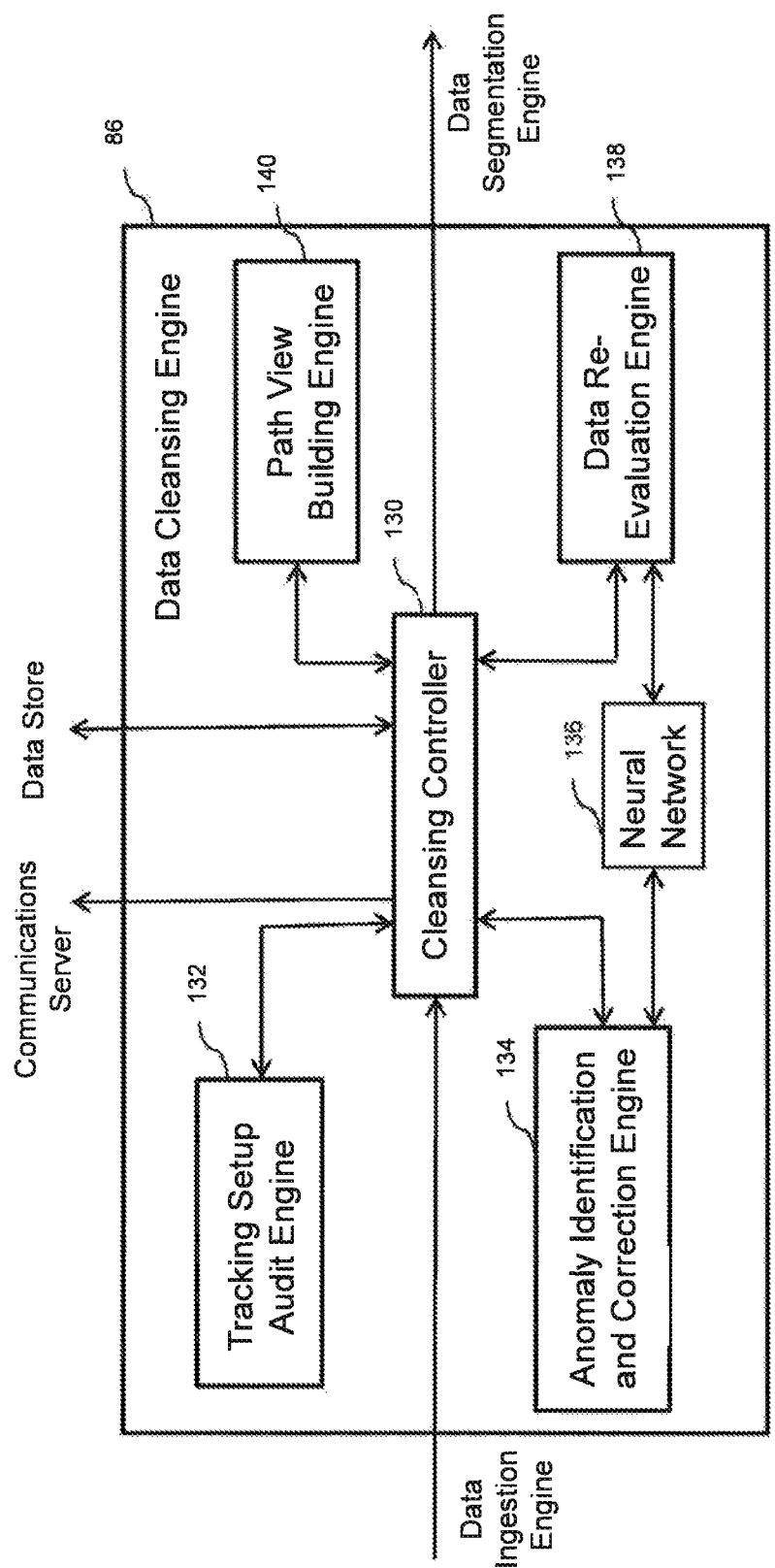
FIG. 6 is a schematic block diagram showing a Data-Cleansing Engine of the QC Data Processing Platform of FIG. 3 in greater detail.

Referring now to FIG. 6, the Data Cleansing Engine 86 is shown in greater detail. The Data Cleansing Engine 86 is controlled by a Cleansing Controller 130, which has access to both the Data Ingestion Engine 82 to receive current session data 85 and to the Data Store 44 to retrieve stored data. The Cleansing Controller 130 is also configured to output cleansed data to the Data Segmentation Engine 88. Finally, the Cleansing Controller 130 has a direct connection to the Communications Server 80 to generate a notification/message that the received session data 85 cannot be processed as it cannot be understood or cannot be cleansed because it has too many errors.

The Cleansing Controller 130 is coupled to four other data processing engines, which make up the Data Cleansing Engine 86. A Tracking Setup Audit Engine 132 takes the input session data 85 and determines the quality of the session data which the website 12 is collecting. This data can be used effectively to audit the settings of the website's user interaction tracking tools. If anomalies are detected these can be flagged up the website 12 together with a suggested fix for the problem. The Data Cleansing Engine 86 also comprises an Anomaly Identification and Correction Engine 134. This part of the QC Data Processing Platform 42 not only detects anomalies but also automatically corrects them as will be described later. In order to carry out this correction process, the Anomaly Identification and Correction Engine 134 is coupled to a neural network 136 such that machine learning can be used to identify areas of concern within the session data and correct anomalies thereby cleansing the data. The neural network 136 will have previously been trained with patterns of abnormalities in data and in use can efficiently detect similar patterns in the vast amounts of received session data 85.

Where poor quality data is input, not only can the Tracking Set Up Audit Engine 132 trigger a message to the source (website) to improve the quality of that data by changing data recordal settings for example, but also the existing session data 85 which has been ingested is sought to be used. The Data Cleansing Engine 86 has a Data Re-Evaluation Engine 138 which is configured to re-evaluate the poor quality data and rather than reject it, seeks to improve the accuracy of the data by finding a 'best-fit' channel to help remove the default. This can help to prevent this potentially inaccurate data from either skewing processing results or being completely ignored in further data processing. In this regard, the data re-evaluation engine 138 is also coupled to the neural network 136 to enable trained data models to be used to help identify the 'best fit' channel for that inaccurate data. More specifically, many analytics/tracking combinations put unknown channel attribution data in a 'Direct' channel, often because that session data has no tracking data associated with it due to anti-tracking measures being employed by a browser. Much of this unknown channel attribution data can contain detailed referrer information which may not be able to be processed normally. The Data-Re-Evaluation Engine 138, in use, can identify particular paid advertising campaigns or abnormal strings in this data which point to organic searches, social media referrals, and those patterns can be added to the system by comparison with known patterns using the neural network 136. This enables the unknown channel attribution data to, for example, be attributed to their 'best fit' channel as opposed to a default bucket channel for more useful analysis.

A Path View Building Engine 140 is the fourth processing engine in the Data Cleansing Engine 86, which is coupled to the Cleansing Controller 130. The Path View Building Engine 140 acts to take individual touchpoints in the session data 85 and pull together those parts which relate to a user's interaction with a particular website 12. The process is far more sophisticated that conventional user session stitching which has been described in the background of the invention and can add further session data 85 to the results of conventional stitching. The Path View Building Engine 140 enables the other raw data 89 (non-session data) to be used to find session data which shares a common hashed identifier with the non-session data. Session data identified in this manner can then be stitched together with other session data which also shares this common identifier. Also the other raw data 89 can be used to corroborate or refine stitching of at least parts of user sessions together. For example, other identifiers in other raw data 89, such as hashed email addresses or social media identifiers, can be used to improve any user session stitching which has been provided in relation to the current session data 85. More specifically, if two users 16 are using the same computer and browser to access a website, using conventional stitching it may not be able to distinguish between these users using the same Client IDs. However, by using the other raw data 89 (non-session data) it may be possible to distinguish between session data from one user and session data from the other user (possibly filtering out some session data not linked to one of the users) because they have different social media identifiers associated with them which can be linked to different session data. Also, the other raw data 89 can be used to pull together more interaction session data associated with one user relating to a particular website 12.

Figure 7A:
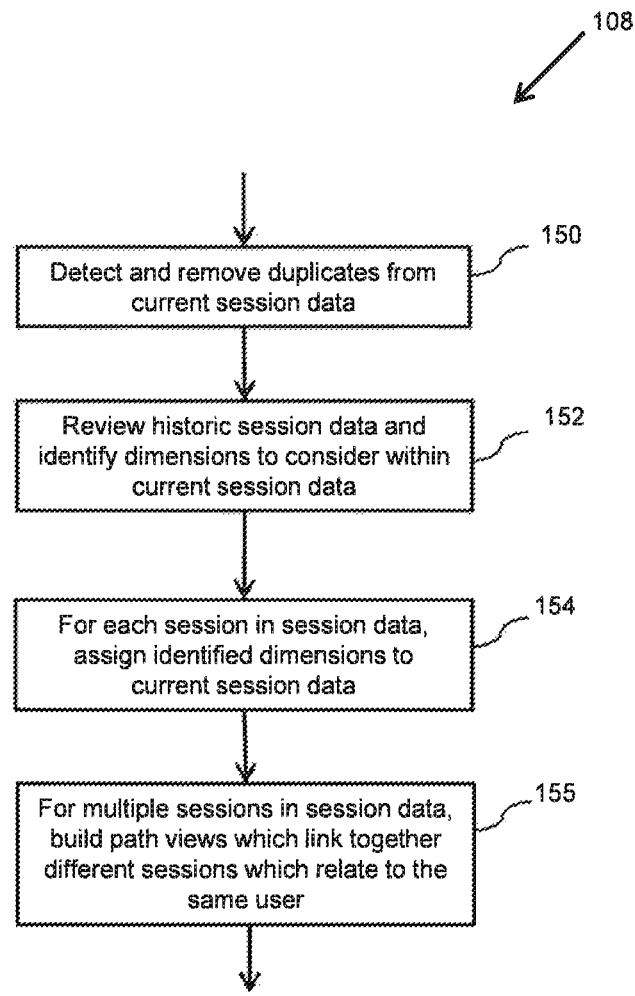
FIG. 7A is a flow diagram showing a method of operation of the Data-Cleansing Engine of FIG. 6.
Figure 7B:
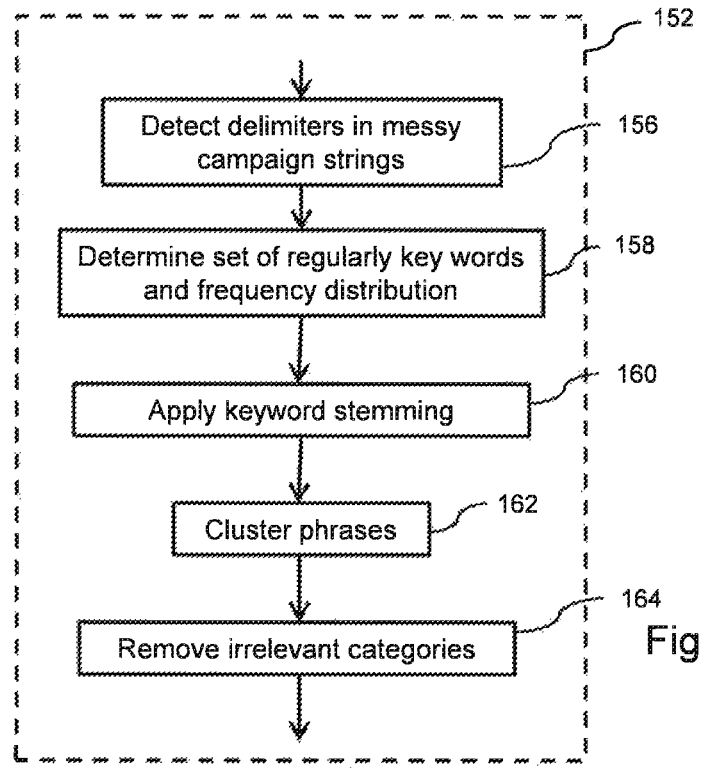
FIG. 7B is a flow diagram showing the step of identifying dimensions to be considered within the current session data of the method of FIG. 7A in greater detail.
Figure 7C:
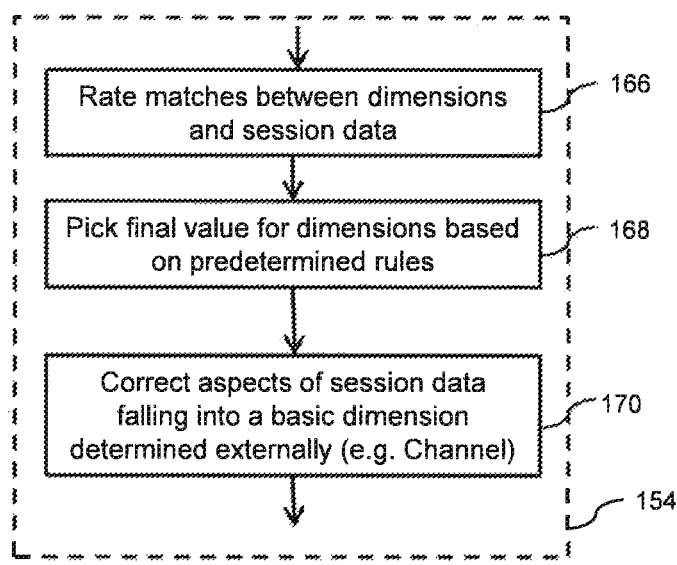
FIG. 7C is a flow diagram showing the step of assigning identified dimension data to the current session data of the method of FIG. 7A in greater detail.

Referring now to FIGS. 7A, 7B and 7C, a method of operation of the Data Cleansing Engine 86 is described in greater detail. The method of data cleansing 108 comprises four main steps. The first step is carried out by the Anomaly Identification and Correction Engine 134 which detects and removes, at Step 152, duplicates from the current session data. Surprisingly, the inventors have found that clickstream feeds providing session data can contain up to 5% duplicate hits (especially in clickstreams received from a data analytics platform called Adobe Analytics™). These duplicates are recognised and removed.

Once the data has been cleansed of duplicates, dimensions to be applied to the current session data are determined, at Step 152. More specifically, the historic session data 87 and also historic other raw data 89, if available, are analysed and dimensions which need to be considered in the current session data are derived. A 'dimension' is an aspect or specific part of a user interaction with a website and can be defined from session data but also from other forms of raw data. The purpose of using dimensions is to assess the quality of interaction of a user with a website 12 which is provided in a basic form of session data and the greater the number of dimensions applied to that session data the more detailed the analysis of that session data can be. For example, if a gender dimension was provided on a clothing campaign with Male/Female/Kids, it would be possible to identify for each of them how valuable a visit was in relation to a specific purchase. For example, women's campaigns could not just contribute to female product sales but also male product sales, if women are more likely to recommend to their spouses.

The definitions of each dimension can be textual and/or numeric and can include identifiers. Examples of common dimensions which are defined by this process are provided below:

Source (origin of traffic to website such as search engine, a domain);

Medium (the general category of the source, for example organic search, cost-per-click paid search, web referral, social-media); A medium can aggregate common misspellings for example the omission of the '-' in the following examples (social, social-network, and social-media);

Channel, e.g. Organic Search, Paid Search, etc. (all standard channels which the QC Analytics Platform uses to categorise the results). The channel can also be a grouping of traffic sources with a common medium.

Engagement, e.g. Bounce (1 to 2 page views in a session), Informational (3 to 10 page views with no purchase in a session), Engaged (>10 page views, no purchase in a session), Purchase (>2 page views with a purchase). It should be noted that visits in a session having less than two page views, but making a purchase are considered to be errors in the session data.

Campaign Dimensions—characteristics of a campaign e.g.
  the targeted gender,
  country,
  store type,
  keyword type (brand, product, own brand, etc.)

Basket Item Characteristics e.g. (brands, the value of basket etc.)

The third step in the cleaning process 108 is to apply, at Step 154, the identified dimensions to the current session data to determine what aspects of that session data 85 are required for the processing Step 112.

This last step in the cleaning process 108 is to build path views, at Step 154, using the Path View Building Engine 140, gathering together session data 85 which otherwise would not be assigned to a particular user and this is described in greater detail later with reference to FIGS. 8 to 10C.

FIG. 7B provides a more detailed look at a data cleansing aspect of the determining step (at Step 152) where the dimensions are to be applied to the current session data 85. This determining step looks at historic session data 87 for the website and historic other raw data 89 and determines some dimensions from that data which are to be applied to give relevant structure to the current session data 85. However, the session data 85 and other raw data 89 can be in a so called 'messy' state, namely data which does not conform to a predetermined structure or format or which does not use a tight definition for describing the same thing. Also over time the names of products and other descriptors can change as can locations on a website. This is because this data is determined externally to the QC Data Processing Platform 42 and by many different entities. Given the degree of variation it is not easy for a computing system or even a human to derive the actual semantic meaning of the data or the category to which the data belongs. So the determining Step 152, includes a cleansing step (shown in detail in FIG. 7B) which is executed before determining the dimensions from the data.

For example consider the following of campaign names:
  UK_BRAND-MEN-SHOES, SC_BRAND_ADIDAS-_RUNNING, FR_BRAND_TREK_BIKE,
  UK_GENERIC_RUNNING, SC_BRAND_F+F_RUNNER, UK_PRODUCT_GARMIN_RUNNING So one problem mentioned above is that these campaigns tend to vary over time and it can be difficult for the QC Data Processing Platform 42 to identify clusters of related and orthogonal keywords. For example taking the names listed in the example above, 'Trek' is related to 'brand' as it is a specific brand, but 'bike' and 'running' are orthogonal as they are very unlikely to ever occur in the same campaign. Another way in which the data can be messy is because of the use of different spellings or versions of the same keyword, and using different delimiters etc.

Accordingly, the determining step 152 comprises an automated clean-up of this data such that for example campaign characteristics (dimensions) can then be applied to that messy data. More specifically, the determining step comprises identifying, at Step 156, the delimiters between words verses words themselves. For example, the character '+' can be both a delimiter between words as well as a part of a brand (namely part of a word).

Whilst logistic regression models exist to quickly identify delimiters in tabular files, they could not be used in the present case. The process of detecting these delimiters in the present embodiment involves looking at the words before and after each delimiter and if it is determined that the words never vary for a specific combination, then they are likely to not be a delimiter, and are not considered as such.

Once the words have been effectively separated, the next step is to determine, at Step 158, a set number of regularly used keywords and their frequency distribution.

The next step comprises applying, at Step 160, keyword stemming techniques. This addresses the problem that in messy data there can be similar but different phrases, such as 'Running' and 'Runner'. The present embodiment uses a heuristic (using the neural network 136) based on key parameters to identify such 'overlaps'.

The metrics which are calculated in this step are:
  The Levenshtein edit distance between these words;
  The size of the commonality between these words; and
  An orthogonality factor (e.g. they never/always appear in the same campaign string)

In this way it is possible to effectively identify keyword stems.

Once the keyword stems have been established, at Step 160, the orthogonality factor of phrases can be used in Step 162, to identify category clusters and the phrases are then placed into the appropriate category clusters.

Finally, the clusters that have been generated are reviewed, at Step 164, and identifiers (IDs) or irrelevant categories are removed. All of this cleansing of data is carried out before building dimensions for the segmentation process, described later.

Referring now to FIG. 7C, the manner in which the identified dimensions are assigned at Step 154 of FIG. 7A to the current session data is now described in greater detail. As has been stated previously the assignment can use just one dimension, but the greater the number of dimensions the more complex and detailed the analysis that can be carried out. Accordingly, using a single dimension is a rare occurrence and not that useful. In most embodiments a plurality of dimensions are used. Typically, four dimensions are used though in some other embodiments eight dimensions have been used. It is to be appreciated that the dimensions can also be applied to restrict the analysis to parts of a user visit/purchase interaction with a website. For example, if there is a brand/generic advertising campaign and this dimension is only to be considered for pay-per-click campaigns, then the use of multiple dimensions enables this type of analysis to be carried out. Because of this multiple use of dimensions, for example to segment visits and purchases it is possible to carry out the following types of analysis "How much did a women's fashion campaign attribute to kids clothing purchases?". The assignment of identified dimensions, in Step 154, is broken down into three stages, Rating, Picking and Correcting.

Rating, at Step 166, is usually done based on one or multiple matching processes. The matching generates a score which is usually binary for example a '1' for a match and a '0' for no match. The matching rules that are used are:

Source data column contains a particular keyword (e.g. find 'brand' in campaign string);

Source data column matches regular expression (e.g. find 'generic' and 'brand' in campaign string but not 'home');

The keywords or expressions to be matched are determined by the analysis, which is to be carried out by the Processor 90 later. In this way, relevant data can be scored highly in relation to the analysis that is to be carried out later.

Whilst the scoring in the above embodiment is binary, in another embodiment the scoring can be additive, for example where there are five criteria, each positive match can add a score of 0.2 to a cumulative score, whereby a cumulative score of 1 indicates a matching of all five criteria.

Also it is possible in other embodiments for the binary scoring to provide a 'true' result for a match or 'false' result for no match.

Picking, at Step 168, a final value for a dimension is determined based on the order of the applicable rules. For binary rules that are either 'true' or 'false', the picking step 168 selects the first match value, namely if any of the words or phrases were found in the data, the result is 'true' for that data for this dimension. For scored-based rules, each match is scored and the picking step 168 selects the best match, namely the data with the highest score for this dimension. For example, if a campaign name is 'mens_wear_shoes' and there is a dimension that contains both the words 'menswear' and 'shoes' as different values, then this process determines which one would be picked.

These rules can be chained and combined to determine a best match between data and a dimension having multiple matching requirements, namely a dimension which requires complex combination of logic regarding matching. For example, test these N binary rules and find any match within three scoring rules and, if all have a score <X then test another binary rule. In cases where no rules match this chain, the picking step 168 can use a default value to enable combination with the outcomes of other rules.

The third step in the assignment of dimensions to session data, at Step 154, is a correction step, at Step 170. The correction step corrects aspects of the session data falling into a basic dimension determined externally, at Step 170.

Some of the dimensions (especially the channel) will be the same as that defined in the known Analytics Platforms 38 by default. However, as has been mentioned previously, the inventors have noticed that some of the output from these platforms is problematic. In this case, some of the rules which have been used to assign a channel for example, seem not to work correctly and could be considered to be 'broken'.

The correction step provides a set of 'rewrites' for session data generated by conventional Analytics Platforms where some of the rules do not appear to work correctly. These rewrite rules simply reassign a particular channel assigned to that data to correct the channel for example. In the present embodiment incorrect channel attribution is carried out by the Data Cleansing Engine 86 having a pre-stored list (not shown) of the top 200 traffic sources and the correct channels for those sources, and then checking the channels assigned to sources in the session data 85 against the pre-stored list. If any traffic sources are found to also be in the list and the channel assigned by the external Analytics Platform 38 does not match that provided in the list, then the channel is corrected to the channel stated in the predetermined list.

Examples

Several email domains, e.g. mail.aol.com, mail.yahoo.com, . . . are assigned as 'Referral' channel rather than 'Email', so the correction step 170 reassigns these domains to the correct channel.

Several search domains, e.g. duckduckgo.com, search.bt.com, search.yahoo.com etc., are attributed to a 'Referral' channel, so the correction step 170 reassigns these domains to the correct channel namely to 'Organic Search'.

Another aspect of data cleansing is to associate more session data to given users thought a process of enhanced stitching. This is carried out by the Path View Building Engine 140, which is shown and now described in greater detail with reference to FIG. 8.

Figure 8:
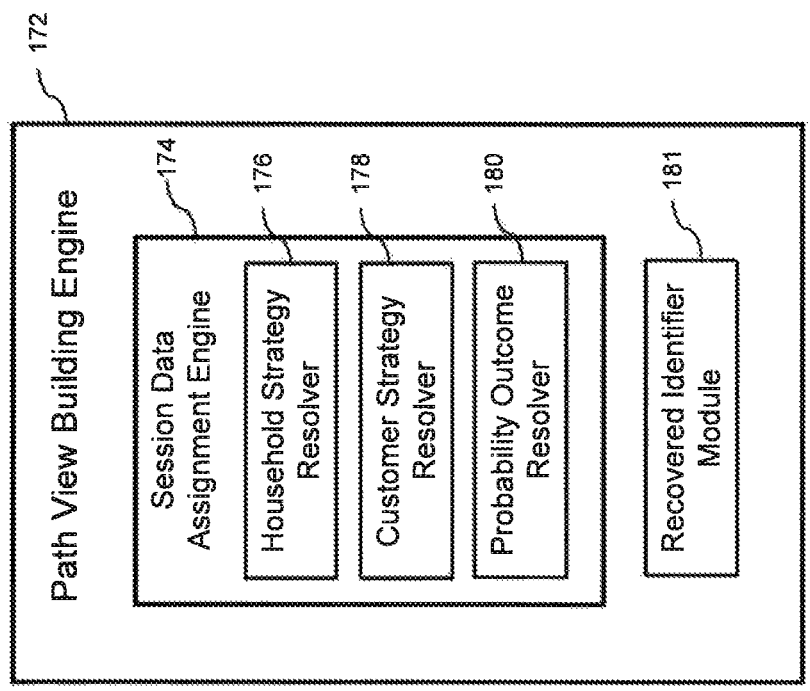
FIG. 8 is a schematic block diagram showing a Path View Building Engine of the Data Cleansing Engine of FIG. 6, in greater detail.

As can be seen from FIG. 8, the Path View Building Engine 140 comprises a Session Data Assignment Engine 174 which is arranged to carry out the path building, namely stitching together session data which belongs to a given user. The Session Data Assignment Engine 174 combines session data relating to different individual visits into a pathway, which can be associated with a significant user interaction event. In the present embodiment, this event is a purchase event on a website, though in other embodiments the event can be something else, for example an abandoned shopping cart event. The Session Data Assignment Engine 174 outputs pathways for a user which are associated with the selected interaction event.

Three different resolvers are provided in the Session Data Assignment Engine 174 for addressing different issues which may arise in the session data. The first is a Household Strategy Resolver 176, which effectively acts to stitch together different session data that relates to the user associated with the particular interaction event. The Household Strategy Resolver 174 addresses the problem that session data stitching is often created from paths based on a single Cookie ID, so users using multiple devices will have some session data which led to that event missing from their pathway, for example they won't have a correct conversion path showing for them. The Household Strategy Resolver 174 uses other data available from the session data, namely User ID data to gather in further session data and associate it with the session data directly related to the interaction event. The process of operation of the Household Strategy Resolver 174 is described below with reference to FIG. 9A.

The second resolver provided in the Session Data Assignment Engine 174 is a Customer Strategy Resolver 178. The Customer Strategy Resolver 178 addresses a problem that occurs with the use of the 'household strategy' of the Household Strategy Resolver 176. This problem occurs if one device is used by many people in a household, then all visits of all users on this device would be attributed to many different purchases, namely they would be treated as if the session data belonged to just one person (user). Also this problem arises and has more severe consequences to data distortion if there is a 'kiosk' type ordering terminal in a retail store which would be used by hundreds of users and using the household strategy all these visits would be attributed to hundreds of purchases and be treated as being for one person or household, despite the events being attached to very different people.

A solution provided by Customer Strategy Resolver 178 of the present embodiment is effectively to use the household strategy only for devices with N or less attached User IDs. The method in which this solution is applied is described later in greater detail with reference to FIG. 9B.

The third resolver provided in the Session Data Assignment Engine 174 is a Probability Outcome Resolver 180. The Probability Outcome Resolver 180 provides a more sophisticated way of combining additional session data to the session data associated with the user. In this regard, it addresses a problem that occurs with the use of both the 'household strategy' of the Household Strategy Resolver 176, and the 'customer strategy' of the Customer Strategy Resolver 178, which is that too much session data can be stitched together by these Resolvers 176, 178. Having very long pathways determined by these resolvers 176, 178 can make the determination of which user pathways and website interactions are relevant to the interaction event being considered and which are not, far more difficult. Accordingly, the Probability Outcome Resolver 180 uses probability data relating to a given visit leading to occurrence of the interaction event (purchase event in this embodiment). This probability can be used to filter out visits from the pathway which have a low probability of leading to the occurrence of the interactive event. The method in which this solution is applied is described later in greater detail with reference to FIG. 9C.

The Path View Building Engine 172 also comprises a Recovered Identifier Module 181 which acts to retrieve identifiers (recovered identifiers) from Other Raw Data 89. The recovered identifiers can be used in several different ways to enhance the path view building function. For example, they can be used to provide another solution in the present embodiment to replace the restriction of N devices only with the requirement to use recovered identifiers from the Other Raw Data 89. These recovered identifiers can be for example user email addresses, user payment identifiers or loyalty scheme identifiers. These identifiers can also be added to the Purchase and Visit Identifiers and cookies considered from the session data to enable enhanced stitching to occur. In particular, if the recovered user identifiers from the Other Raw Data 89 comprise a first and a second different user identifiers and the data re-evaluation engine associates the first user identifier with the linked session data and the second user identifier with the unlinked session data, then the unlinked session data can now be linked to the linked session data. The recovered user identifiers can also be used to confirm that session stitching carried out by use of Purchase and Visit Identifiers and cookies is indeed correct.

Figure 9A:
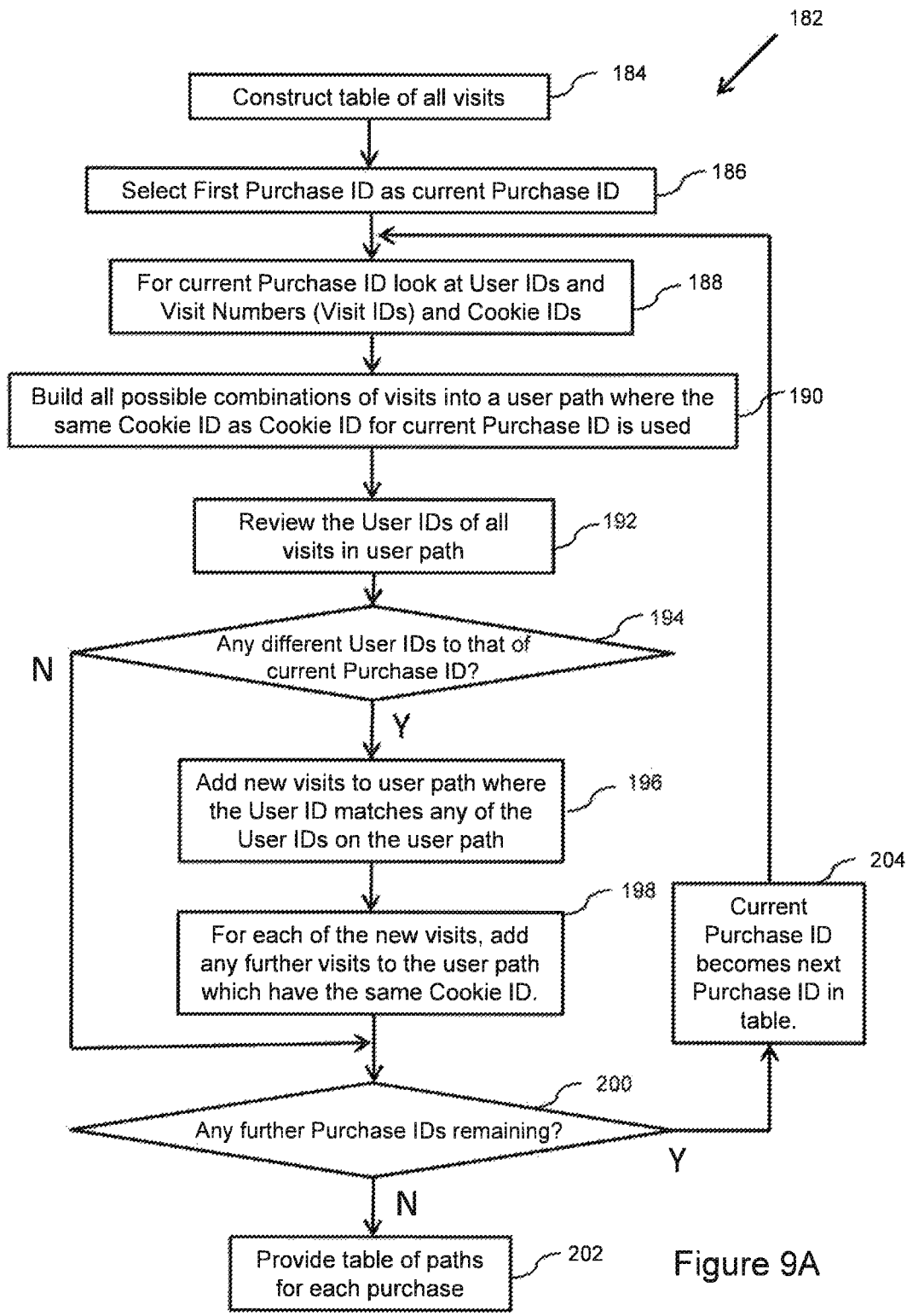
FIG. 9A is a flow diagram showing a method of operation of the Path View Building Engine of FIG. 8 implementing a Household Strategy.

Referring now to FIG. 9A a method of operation 182 of the Household Strategy Resolver 176 is now described in detail. The Household Strategy Resolver 176 combines session data from a single device and so where the device is a shared device, such as the shared household computer 18, the results are considered to be from a single entity, namely a household which could include different actual users.

The method 182 commences with a construction, at Step 184, of a table 220 of all visits from the session data for a given website 12 (see FIG. 10 for an example). The table has columns for Cookie IDs, Visit IDs (also known as Visit Numbers), UserIDs and Purchase IDs and each row relates to a particular visit of a user. A Purchase ID is an identifier of the interaction event and the data recorded in relation to that user visit. It is to be appreciated that session data from different sources is not consistent and so sometimes a User ID may be missing, or session data relating to a particular visit number may also be missing (for example if tracking is disabled on a user's browser for that visit-gaps in tracking are actually common). Also in some cases Websites 12 may create User IDs 30 but simply may not provide them or provide them only under certain circumstances (a purchase for example), externally for analysis. Having said this, a Purchase ID is almost always available from a website 12.

The method 182 continues with selection, at Step 186, of a first purchase ID from the table as the current Purchase ID. The session data 85 is combined in relation to each interaction event (purchase event in this embodiment) and so next for the current Purchase ID the relevant data (row) from the table is considered, at Step 188, for combining. The method 182 continues with the building, at Step 190, of all possible combinations of visit data into a user path where the same Cookie ID 26 and the Cookie ID 26 for the current Purchase ID is used. Once this basic user path linking together different visits within the session data has been created, the method then reviews, at Step 192, all of the User IDs 30 of all visits in the basic user path. A determination is made at Step 194, if any different User IDs to that provided by the current Purchase ID are present. If there are different User IDs present, then the visit data for each of these other User IDs is added to the basic user path. Following this for each of the new user visits, any further visits which have the same CookieID are added at Step 198, to the user path. This effectively stitches together previously non-associated user visit data with the user visit data linked to the interactive event (purchase event) and completes the user path for the current Purchase ID. If the determination carried out at Step 194, is negative, then the basic user path is considered to be complete for the current PurchaseID and the above steps of adding (Steps 196 and 198) further visit data to the basic user path are omitted.

Once the user path has been completed for the current Purchase ID, the current session data in the table is further considered to determine, at Step 200, if there are any further Purchase IDs to consider. If not then a table of user paths for each purchase event is provided at Step 202 as output, with each row setting out a pathway of different session data describing user interaction associated with the purchase event. If however there are further Purchase IDs in the current session data in the table then the method 182 continues with the next Purchase ID in the table being assigned, at Step 204, to the Current Purchase ID and the above-described steps (Steps 188 to 200) of determining the user path for the current Purchase ID being carried out.

Figure 9B:
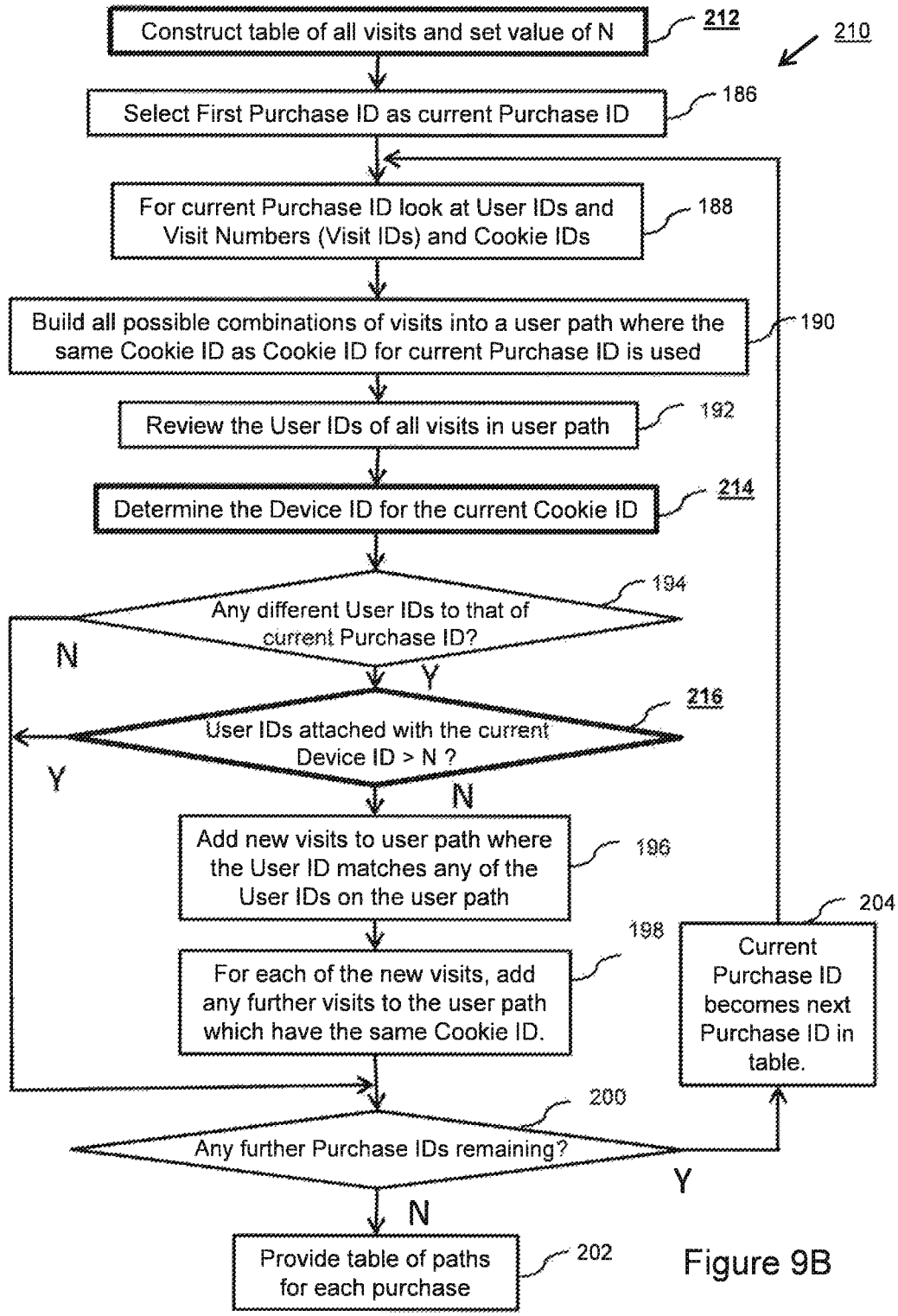
FIG. 9B is a flow diagram showing a method of operation of the Path View Building Engine of FIG. 6 implementing a Customer Strategy.

Referring now to FIG. 9B a method of operation 210 of the Customer Strategy Resolver 178 is now described. The Customer Strategy Resolver 178 can control the combination session data from a single device attributed to different users. More specifically, it can set the number of different users for each device and only combine session data if the number of users does not exceed the set amount. Accordingly, where the device is a shared device, such as the shared household computer 18, the results can be considered to be from different entities, and so session data from multiple different users of the same device can be treated separately and not combined. Put another way, a solution provided by the customer strategy of the present embodiment is where the household strategy is used only for devices with N or less attached User IDs.

The operation of the Customer Strategy Resolver 178, is similar to that described above in relation to the operation of the Household Strategy Resolver 176 and shown in FIG. 9A. In view of this only the differences, which have been highlighted in FIG. 9B, will be described below. The method 210 commences with the construction, at Step 212 of a table of all visits from the session data for a given website 12 in the same manner as has been described above in Step 184 of FIG. 9A. In addition device identifiers are available to show the identity of the user device which was used for the session data. The construction step 212 also includes the setting of a parameter N which determines the number of unique users using a particular device which will be accepted for aggregation of session data.

The method 210 continues in the same manner as has been described above in relation to the method 182 and FIG. 9A executing Steps 186 to 194. If the outcome of Step 194 is that there are different User IDs to that of the present PurchaseID then the additional check of determining, at Step 216, if the number of UserIDs attached with the current Device ID 28 is greater than N, is carried out. This is determined from the table which includes the Device IDs 28. If the number of UserIDs 30 attached with the current Device ID 28 is less than N then the steps of adding (Steps 196 and 198) further visit data to the basic user path (described above in relation to the method 182 and FIG. 9A) are carried out. Otherwise the basic user path is considered to be complete for the current PurchaseID and the steps of adding (Steps 196 and 198) further visit data to the basic user path are omitted.

Regarding the operation of the Probability Outcome Resolver 180, the operation is similar to that described above in relation to the operation of the Customer Strategy Resolver 178 and shown in FIG. 9B. In view of this, only the differences will be described below. The session data stitching occurs in the same manner as described in this embodiment with two differences. The first difference is part of the set up where in addition to the table construction and determination of N, at Step 212, the method includes determining an average probability metric of a user visit leading to a purchase event (or other specified interaction event). This is effectively based on the historical session data 89 about user visits and the outcomes in relation to the interactive event (purchase). More specifically, this historical session data 89 is used to create a model 92 that establishes the probability of a user making a purchase based on characteristics of a visit (for example page views, number of items added to the basket, removed, time between page views etc.). From this model the average probability metric of a user making a purchase is determined and stored. It is to be appreciated that a combination of time-frequency patterns, the use of IP addresses and Cookies 26 can be used to identify households, for example. In other embodiments, this average probability metric can be provided by a third-party data provider.

The second difference is at the point in the method 210 where the number of UserIDs attached with Current Device ID is determined and compared, at Step 216, to the specified number N; this step is followed by the additional step of determining the probability of the visit data relating to a visit to be added to the basic user path will result in a purchase event. Once determined, this probability is compared to the previously determined average probability metric. If the visit to be combined with the basic data path has a probability which is greater than the average probability metric it is combined with basic user path, otherwise it is not permitted to be added. This additional condition can reduce the amount of additional session data which is added to the basic user path as compared to the outcome of the Customer Strategy Resolver 178.

Figure 9C:
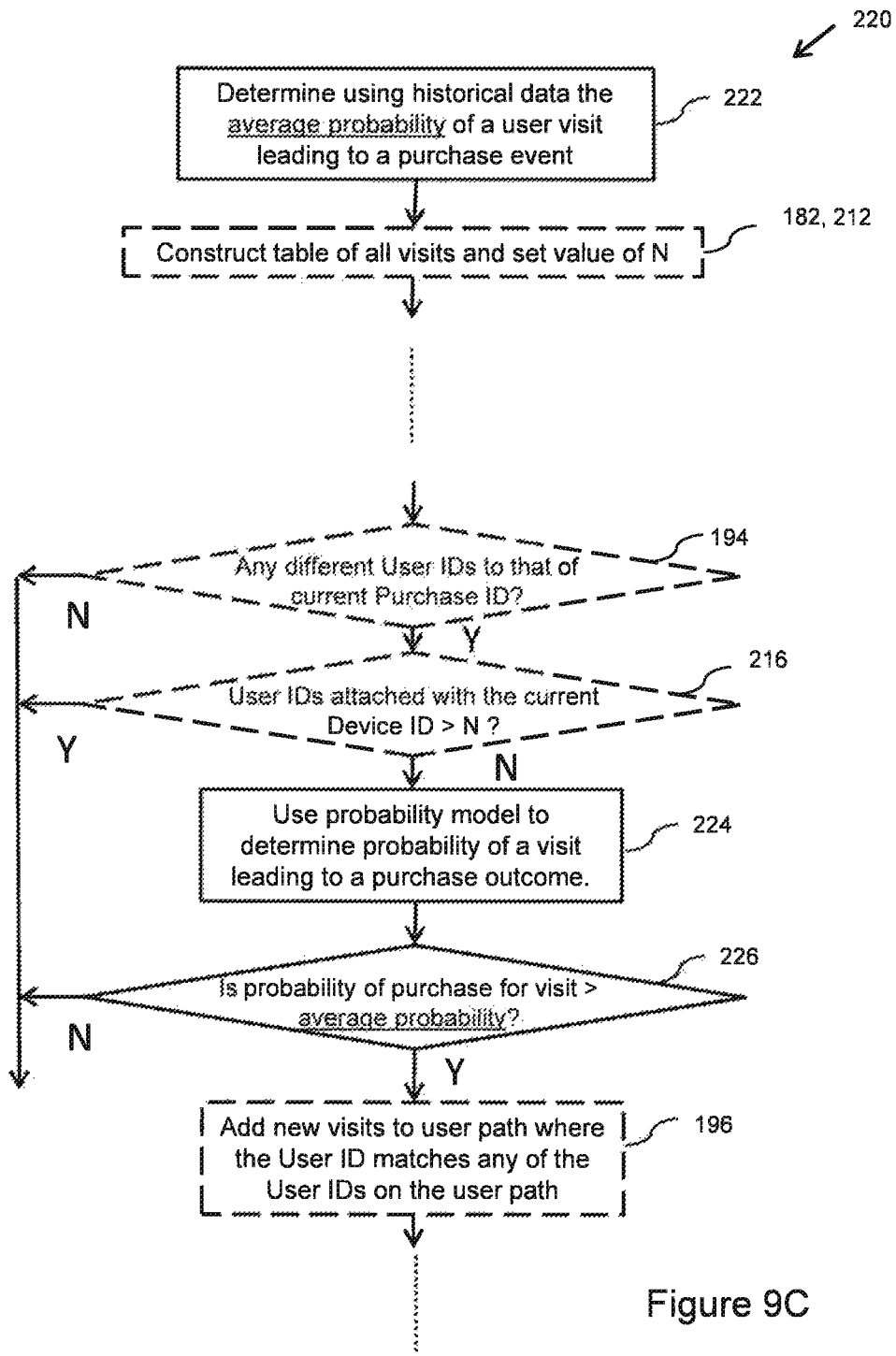
FIG. 9C is a flow diagram showing a method of operation of the Path View Building Engine of FIG. 6 implementing a Probability Outcome Strategy.

Referring now to FIG. 9C a method of operation 210 of the Probability Outcome Resolver 180 is now described. The Probability Outcome Resolver 180 works to filter out session data relating to a given visit which has a low probability of leading to the interaction event (purchase event in this embodiment).

The operation of the Probability Outcome Resolver 180 is similar to that described above in relation to the operation of the Household Strategy Resolver 176 (shown in FIG. 9A) or the Customer Strategy Resolver 178 (shown in FIG. 9B). In view of this, only the differences will be described below.

The only differences in the method 220 of operation of the Probability Outcome Resolver 180 are three additional steps which can be added to the methods 182, 210 described in either FIG. 9A or 9B. The first step is that of establishing, at Step 222, an average probability of a user making a purchase precedes the step of constructing 182, 212 the table of all visits from the session data. In this step 222, every instance of a user making a visit to a website and whether that visit resulted in a purchase event is determined using historical session data 87 stored in the Data Store 44. From this data an average probability of a user making a purchase is determined and stored.

The method 220 continues as has been described in FIGS. 9A and 9B until either the check is carried out, at Step 194, to determine whether any different User IDs to that provided by the current Purchase ID are present (FIG. 9A) or whether the additional check of determining, at Step 216, if the number of UserIDs attached with the current Device ID 28 is greater than N (FIG. 9B). Following either one of these steps (shown in dashed lines in FIG. 9C), the second and third additional steps are carried out. The second additional step involves the probability model 92 being used, at Step 224, to determine the probability of a visit leading to a purchase outcome. This is determined by looking at the characteristics of a website visit, namely page views, number of items added to the basket, number of items removed from the basket, time between page views, etc. These characteristics make up a pattern and the pattern is compared to patterns stored in the probability model 92 which is based on historical data 87. Typically, this includes using the neural network 136.

Once the probability of this visit leading to a purchase has been determined, the third additional step of comparing, at Step 226, this to the average probability of a user visit leading to a purchase is carried out. If the current visit probability is greater than the average probability, then the method continues to add, at Step 196, a new visit to the user path where the User ID matches and one of the User IDs on the user path as has been described previously with reference to FIG. 9A. Otherwise, if the current visit probability is not greater than the average probability, as determined at Step 226, the step of adding new visits, at Step 196, is avoided as shown in FIG. 9C.

Referring now to FIGS. 10A, 10B and 10C a non-limiting example of the operation of the Session Data Assignment Engine is now described. FIG. 10A shows a table 220 of information about session data received from an Analytics Platform. The information about the session data looks at IDs related to that visit and this can be used for path building. The information is set out with each visit being provided on a single row of the table 220 with columns for the identifiers relating to each visit. These columns are Cookie ID 222, Visit Number (Visit ID) 224, UserID 226 and Purchase ID 228 as have been described above.

FIG. 10B shows the result of applying the Household Strategy to this table 220 of session data. The results are in the form of a list 230 of pathways 232 of stitched session data (visit data) with each element 234 of the pathway 232 being related to a particular visit number 224 and Cookie ID 222 combination (e.g. v2, co1). The pathways 232 are provided as being related to the interactive event (in this case the purchase event), which are in turn distinguished by the Purchase ID 228. The results also provide the User ID 226 associated with each pathway 230 of the results.

As can be seen, the first pathway 232, related to Purchase ID p1, comprises (co1,v1), (co1,v2), (co1,v3). In this case, no other cookie was involved in this purchase. The second pathway 232 related to purchase ID p2 comprises (co1,v1), (co1,v2), (co1,v3), (co2,v1), (co2,v2), (co1,v4), (co1,v5). Here it can be seen that at the point of the purchase event p2, visits stored by Cookie ID co2 were never used to make a purchase. However, the user in the session with this cookie once logged in and associated User ID c12 with the Cookie ID co2. So when Purchase ID p2 is also made by User ID c12, all cookies that were previously associated with this User ID are used to build the conversion path 232 for Purchase ID p2.

Finally, the third pathway comprises (co1,v1), (co1,v2), (co1,v3), (co2,v1), (co2,v2), (co1,v4), (co1,v5), (co2,v4). Again the cookies 26 are being stitched to a single user as the User ID c11 also identified as User ID c12 on the same cookie, and therefore they are considered to be from the same household. Note that Visit number v3 for Cookie ID co2 is missing from the table. This is because as has been mentioned above sometimes the data that is received is missing visit data (in this case the v3 (third visit data) for co2 (cookie 2) has not been provided).

FIG. 10C shows the result 230 of applying the customer strategy to this table 220 of session data. In this case N is set as the value 1 to prevent session data from multiple users of the same device from being stitched together. In other embodiments N can be set to a different value depending on the tolerance in the number of users of a device that is required in the results.

As can be seen, the first pathway and second pathways 232, related to Purchase ID 1 and Purchase ID 2 respectively, are the same as that set out in FIG. 10B. In other words, the setting of N to a value of 1 has no difference to the results of the Household Strategy as reflected in the customer strategy, so in these pathways, there are no cases of two users using the same cookie. However, for the third pathway Purchase ID p3, the results are different. More specifically, in this case the results are (co2,v1), (co2,v2), (co2,v4) only. The results indicate that on Visit ID v4 using Cookie ID co2 a purchase was made. All sessions with the same Cookie ID (co2) are stitched together. However, even though the User ID of c11 for this visit is the same as that for Cookie ID c01 on Visit ID v2, which then would lead to all the visits for Cookie ID co2 being added to the path, this is not done because Cookie ID c01 has the same Device ID as Cookie ID co2 and so is excluded by the setting of N=1. In this way, the session data of additional users is excluded from the results of the pathway stitching such that each pathway always represents just one user (when N=1) per device.

Figure 11:
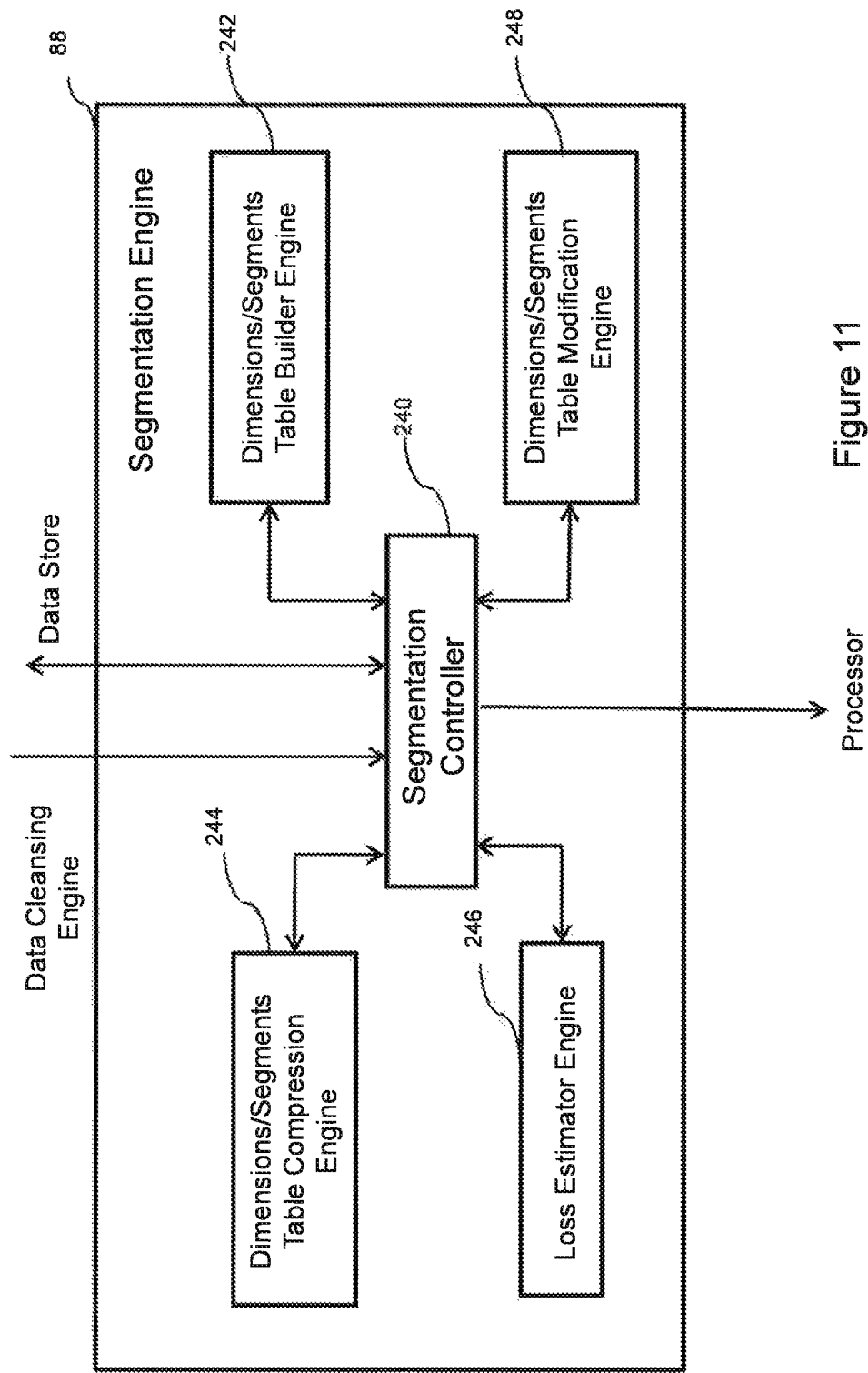
FIG. 11 is a schematic block diagram showing a Data Segmentation Engine of the QC Data Processing Platform of FIG. 3 in greater detail.

The result of the data cleansing process 108 is that session data has been structured using dimensions and is stitched together to create user journeys, or paths 232. This cleansed data is then made available to the Segmentation Engine 88 which is described below in detail with reference to FIG. 11. The objective of the Segmentation Engine 88 is to segment the session data to make the analysis by the Processor 90 more specific and accurate. Segmentation prior to analysis by the Processor 90 can also enable session data relating to users to be grouped together in 'cohorts' to make broader analysis of groups of user interaction possible. The cohorts can be grouped together in many different ways for example geographically, by certain behavioural patterns or even temporal characteristics (such as a website's lifespan with users). A segment can be considered to be a possible combination of different dimensions for a particular outcome, or in other words, a segment is effectively every unique combination of values across the dimensions assigned to that data.

Whilst the provision of more and more dimensions to enable the data to be more easily analysed would seem to be a logical way to make the processing task easier, there is a significant problem which has mitigated the use of multiple dimensions prior to the advent of the present embodiment. As more and more dimensions are introduced into any data structure or model, the risk of analysing on the basis of outliers in that data (e.g. segments made up of a tiny number of users) becomes greater. If outliers are considered, then this introduces inaccuracy in the processed results, which has in the past, prejudiced the application of multiple dimensions to the received session data. Looking at a practical example of this, if session data is received from a website which has 5,000 purchase events each day, and taking the purchase event as being the segmentation resolution, and so 5,000 segments are created based on historic data, then there is an average of one user per segment. However, in practice, there is a realistically probability that about 80% of segments created from historic data will be unused on any given day. This is because many of the segments relating to one user are the same as segments applying to another user, namely the possible combination of different dimensions for a particular outcome of a purchase is the same for most purchases. Accordingly, the distribution of different segments across the range of possible segments from each purchase event is not uniform. However, by treating this distribution uniformly, by increasing the number of segments, there is a risk of introducing noise. This can result in thousands of possible segments (based on historic data) many of which would not be used on an average day in the current session data. The Segmentation Engine 88 of the present embodiment overcomes this problem by looking at historical data to determine what the most commonly used segments are, and then reduces the effect of the other possible segments thereby mitigating the effect of outliers as is described in detail below.

The Segmentation Engine 88 comprises a Segmentation Controller 240, which is arranged to receive the output of the Data Cleansing Engine 86, coordinate with all of the other components of the Segmentation Engine 88 and output the cleansed and segmented session data to the Processor 90. The other components operatively connected to the Segmentation Controller include a Dimensions/Segments Table Builder Engine 242, which uses historical data regarding dimensions stored in the Data Store 44 related to that website and a frequency analysis to build all possible combinations of dimensions into a table. Also provided is a Dimensions/Segments Table Compression Engine 244 which acts to effectively compress the table built by the Dimensions/Segments Table Builder Engine 242 into a compressed table, with low-frequency segments being combined into plurality of single segments. A Loss Estimator Engine 246 is also provided to determine the amount of loss attributed to the compressed segments of the table. Finally, a Dimensions/Segments Table Modification Engine 248 is provided to effectively remove any segments from the compressed table, which are not considered to contribute significantly to the outcome. This helps to simplify the compressed table 230 further. Finally, the compressed table 230 is used to segment the current session data 85, namely to determine which of the segments of the compressed table current purchase/visit data belongs to.

Figure 12:
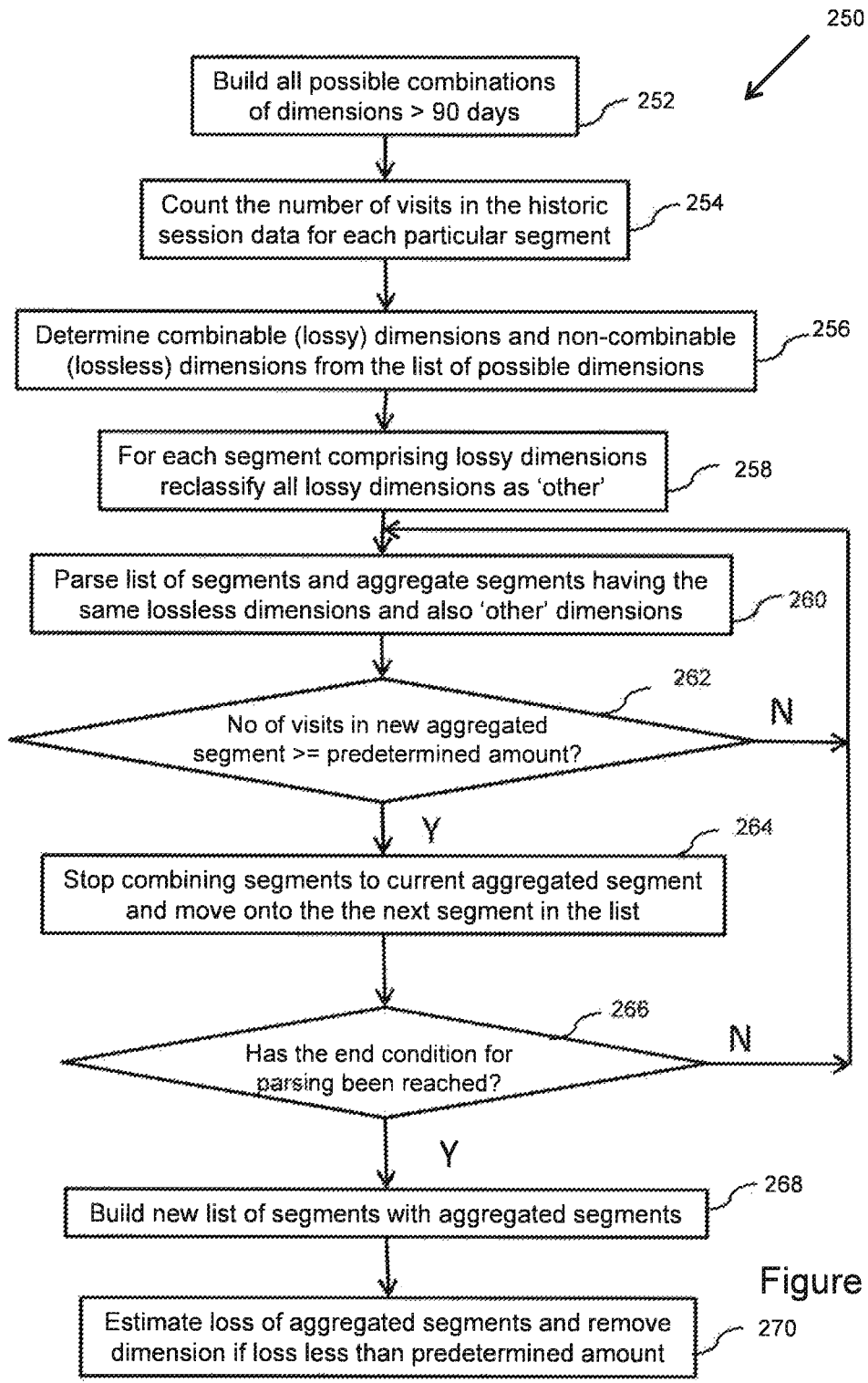
FIG. 12 is a flow diagram showing a method of the operation of the Data Segmentation Engine of FIG. 11.

Referring to FIG. 12, a method 250 of operation of the Segmentation Engine 88, which carries out the segmentation process 110 is now described. The objective of the Segmentation Engine 88 is to look at the dimensions assigned to the current session data 85 and determine which segment, if any, each purchase/visit of the current session data 85 belongs to. However in order to do so, a table of historical segments and dimensions (the compressed table) needs to be built, against which the current session data will be compared. A method 250 of building the compressed table is now described.

The method 250 commences with the N (the number of dimensions applied to the session data) dimensions of the session data 85 being analysed and a table (280—see FIG. 13A for an example) of the segments which are made up of the different combinations of N dimensions, being built, at Step 252. N has previously been selected to best determine the type of analysis to be carried out but typically N is a number >1. More specifically, looking back over more than 90 days, in this embodiment this can be up to 2 years' worth of data, a table is built, at Step 252, of the specific historic data regarding combinations of visits on a given website, which lead to a purchase. This data is taken from the historical data 87 in stored in the Data Store 44. Once all the different segments of the table have been determined, the number of visits per day corresponding to each segment is counted, at Step 254, and the number of visits for each segment per day added to the table. At this stage, the table is effectively a histogram of segments taken over a period of time (a day in this case), which have all resulted in a purchase event.

The method 250 continues with a determination, at Step 256, of combinable (lossy) dimensions and non-combinable (lossless) dimensions. 'Lossless' means: there can be no aggregation across different values of this dimension, namely that none of the records will be 'reattributed to other'. 'Lossy' means that if the frequency of a specific value is very low, the Segmentation Engine 88 can group the values of the rare segment combinations under 'other' as is described in detail below. In one embodiment, the lossy and lossless dimensions can be pre-determined according to the type of analysis to be carried out. For example, if one dimension is a geographic dimension of website access from the UK (Dimension A), and another dimension is website access by female users (Dimension B), then Dimension A can be defined as a lossy dimension and can be combined together with Dimension B to provide an aggregated dimension which provides data on female users from the UK.

Following determination, at Step 256, of lossy and lossless dimensions, for each segment of the table which includes lossy dimensions, the lossy dimensions of that segment are each re-categorised, at Step 258, as 'other'. Then the list of segments making up the table 280 is parsed from the bottom up (namely starting with the segments having the smallest number of visits per day), at Step 260, and the segments having the same lossless dimensions and also 'other' dimensions are combined together, also at Step 260, into a new single aggregated segment with their respective number of visits per day also being combined. The number of visits per day for the new aggregated segment is then considered, at Step 262, and compared to a predetermined maximum size of aggregated segment. Typically, this predetermined size is 5 to 10 visits per day, though in other embodiments this can be larger. If the number of visits per day for the new aggregated segment is less than the predetermined amount, then the method 250 returns back to the parsing of the list, at Step 260. Otherwise, when the maximum size of the new aggregated segment has been reached, then the method stops combining dimensions for the current aggregated segment and moves, at Step 264, onto the next segment in the list. Further parsing and combination of dimensions is carried out for the new aggregated segment.

Next a check is carried out, at Step 266, to determine if the end condition for parsing has been reached. If it has not then the method returns to the parsing of the list at Step 260, using the new aggregated segment as determined at Step 264. Otherwise, the method 250 proceeds to build, at Step 268, a new list of segments with aggregated segments and non-aggregated segments. The end condition for parsing can be one of several circumstances. Firstly, if all of the list has been parsed or all of the 'other' categories of dimension have been considered, then the end condition is met. Also if the number of visits per day of the new aggregated segment exceeds the predetermined amount, then the end condition is also met.

Finally, following the building, at Step 268, of the new list of aggregated and non-aggregated segments, the method 250 continues with estimating, at Step 270, the loss of each of the aggregated segments, if that segment is not to be considered going forward. The 'loss' can be considered alternatively to be the contribution of the aggregated segment to the overall picture of segments related to the website under consideration. If the loss is calculated to be less than a predetermined amount, then the dimension associated with 'other' is removed from the new list. For example, if the aggregated segment has a number of visits per day less than 0.01% of the total visits per day in the table, and less than 4% of visits per day with the 'lost' dimension (the dimensions being assigned to 'other'), then the dimension can be removed from the table.

Once less significant entries have been removed using the above method 250, the results are placed into a compressed table 292. The current session data 85 is then compared against the compressed table 292 to provide meaningful cleansed and segmented data without the problems of noise outlined above.

Referring now to FIG. 13A there is shown a non-aggregated table 280 of segments 282 of historic data 87 which are subdivided into the dimensions 284 making up the particular segment 282. Each dimension 284 is defined as being either 'lossy' 286 or 'lossless' 288. Finally, a column of visits 290 is provided to show how many visits per day used that particular combination of dimensions 284 to result in a predetermined event, a Purchase Event in this embodiment. For example, the first row in the table 280 shows the characteristics of the first segment 282: the segment has value of 'A' for Dimension 1, a value of 'A' for Dimension 2, . . . and a value of 'A' for Dimension N. The average number of visits per day is 1,000,000. The last row in the table 280 shows the characteristics of the last segment 282: the last segment has value of 'A' for Dimension 1, a value of 'B' for Dimension 2, . . . and a value of 'C' for Dimension N. The average number of visits per day is 1.

Referring now to FIG. 13B there is shown an aggregated table 292 of segments 282 of historic data that shows the results of the non-aggregated table 280 of FIG. 13A having been compressed by the method 250. Where a dimension is not to be aggregated (lossless 288), such as Dimension 1, it maintains the same values and entries as the non-compressed table 280. In this case, see non-aggregated segments 294. However, where dimensions can be aggregated (lossy 286), such as Dimension 2, it substitutes the value 'other' 296 for these dimension values and enables aggregation with the number of visits per day not exceeding the predetermined amount, in this case that predetermined amount is an average of '5 visits per day'. This results in an aggregated segment 298 being created to replace corresponding rows in the non-aggregated table 280. Some of the original segments 282 of the non-aggregated table 280 are removed as having very low significance to the results.

Once the data has been cleaned and segmented, a machine-learning process is run to determine the likelihood of occurrence of a predetermined event based on the user interaction with the website and the pathway taken to get there. In the present embodiment, conversion of user interactions to a purchase event, namely attribution at Step 114, is measured by the QC Data Processing Platform 42. This processing is provided to unlock insight around the users and the patterns of their interaction behaviour.

Figure 14:
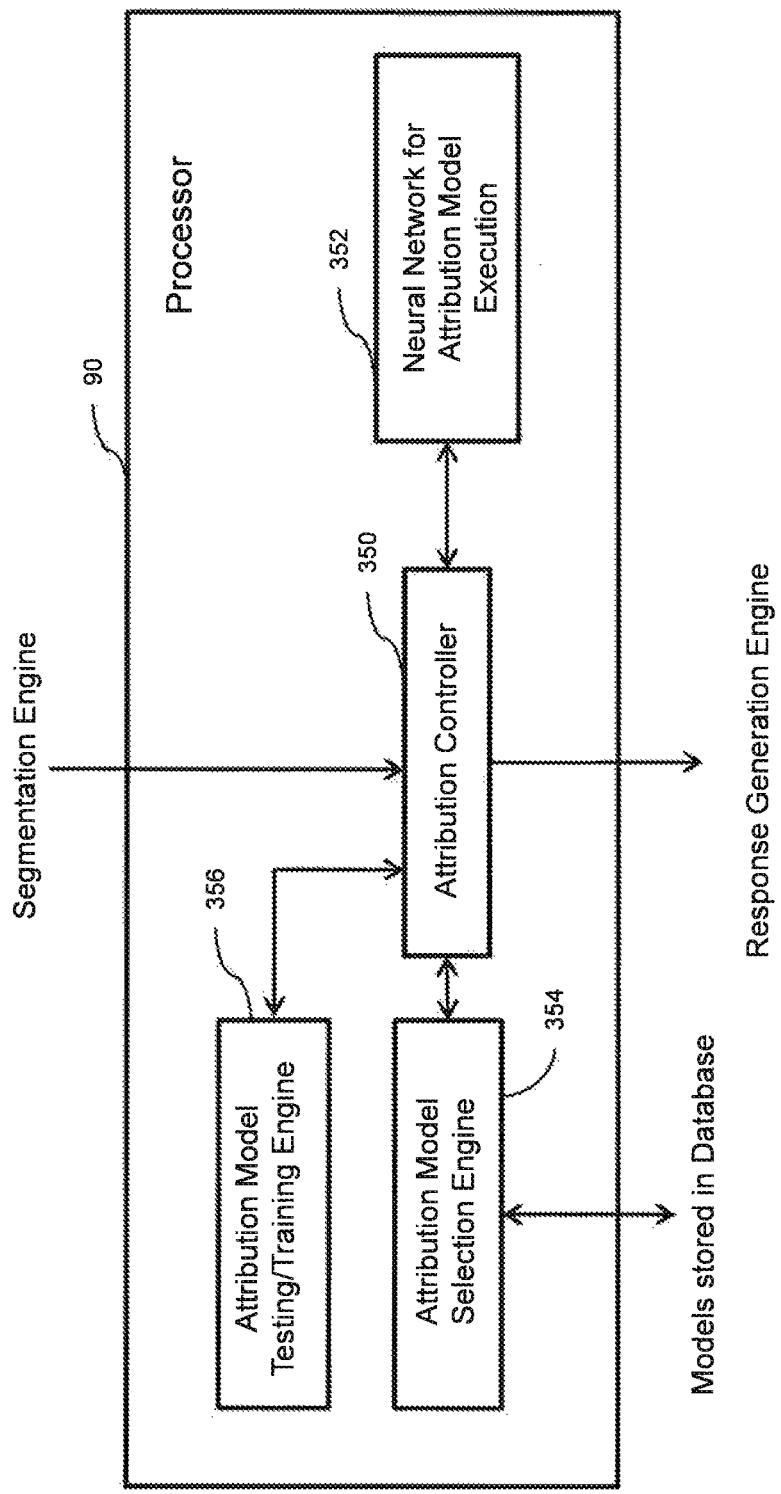
FIG. 14 is a schematic block diagram showing a Processor of the QC Data Processing Platform of FIG. 3 in greater detail.

More specifically, referring to FIG. 14, the process of attribution, at Step 114, which is carried out by the Processor 90, is now described. The Processor 90 comprises an Attribution Controller 350, which receives the cleansed and segmented current data from the Segmentation Engine 88 and generates a processed response, which is sent to the Response Generation Engine 94 for reporting. At the heart of the Processor 90 is a neural network 352, which is arranged compare the current data with each one of several statistical machine-learning models 92 stored in the Data Store 44. Through this comparison, one best-fitting attribution model 92 is selected to most accurately map onto the cleaned and segmented data for a website 12. In the present embodiment, the type of user interactions with the website 12 is key, as are the size of the business, the volume and value of purchases. These are the key factors in the automated selection of the most appropriate model 92. In this regard, the Processor 90 also comprises an Attribution Model Selection Engine 354, which retrieves one model 92 at a time form the Data Store 44 and provides this to the Attribution Controller 350 to configure the Neural Network 352.

The Processor 90 also comprises an Attribution Model Testing/Training Engine 356 which acts to create the models 92 through the practice of training the Neural Network 352 with known website data and attribution levels. Website statistical data is used by the Attribution Model Testing/Training Engine 356 to train several models 92 and then the cleansed and segmented data is compared to find the model 92 with the best match to the current session data.

The machine-learning component of the processor 90 is used to understand the value of an individual visit to a website. This then allows the relative value of the visit to be attributed to the relevant media channels in the journey.

In addition to statistical models, a Markov chain model 92 is used for attribution, to look at subset chains of events in the user journey and identify patterns of user behaviours. The length of the chain to be evaluated can vary dependent on the type of market a website operates in and how much variance exists in the data. By identifying the chains, which lead to conversion, the value to individual channels in the process can be accurately attributed. Markov chain models evaluate the probability to move from one state to another in the user journey. By knowing this, the likelihood of movement towards a successful conversion can be predicted to better attribute value to it. It also allows the likelihood of an individual to convert in their eventual journey.

The use and advantages of using the Markov model 92 are now described in greater detail. A major problem in attribution is that there is often a great deal of 'direct' traffic to a website. Direct traffic is any traffic with a pathway where users have used anti-tracking measures, or have arrived at the website using a bookmark or where the user has simply typed in the URL. The Markov Model is better at reducing the attribution to 'direct' traffic than other models, but still easily attributes 40% of traffic to this channel.

The Markov Model 92 and Processor 90 can be configured to address this problem in one of three ways. Firstly, all 'direct' traffic can be simply removed from the path—unless all visits are classed as 'direct'. This the simplest way of addressing the problem but has the downside of ignoring possibly valuable data. An alternative method is to reattribute all 'direct' traffic to the nearest previous (namely most recent) non-direct visit for the same user. This then stresses the importance of this segment in the overall path. Another alternative is to carry out the above alternative method but to add a new dimension 'former direct' to show the importance of the previous channel whilst being able to distinguish between actual visits via this channel and follow up visits.

Given the volume and complexity of the cleaned session data, it is also necessary in the Processor 90 to reduce the complexity of the session data so that existing 'off the shelf' Markov Models 92 can be used. In particular, if the number of visits is high in the session data, the inventors have found this can cause problems. Accordingly, the Attribution Controller 350 reduces the number of visits to the last 50, 100 and 120 visits of the data and the difference in results has been found to be fairly minor. Alternatively it is possible to reduce the session data by modelling purchases made at different times of day separately. This then reduces the overall number of paths in each model run.

The Attribution Controller 350 is also configured to adjust for loss. When the Processor 90 is looking at the attribution value for a specific dimension value, it is possible for the Attribution Controller 350 to estimate a 'lossless' value. To do so it is possible to adjust the actual revenue vs the modelled revenue. For example, if a particular lossy dimension has a loss of 4% of visits attributed to 'other', it is possible to adjust for this by storing the remaining 96% 'coverage'. When displaying attributed revenue for this dimension, it is possible for the Attribution Controller 350 to adjust the attributed value by dividing it by 0.96.

Figure 15:
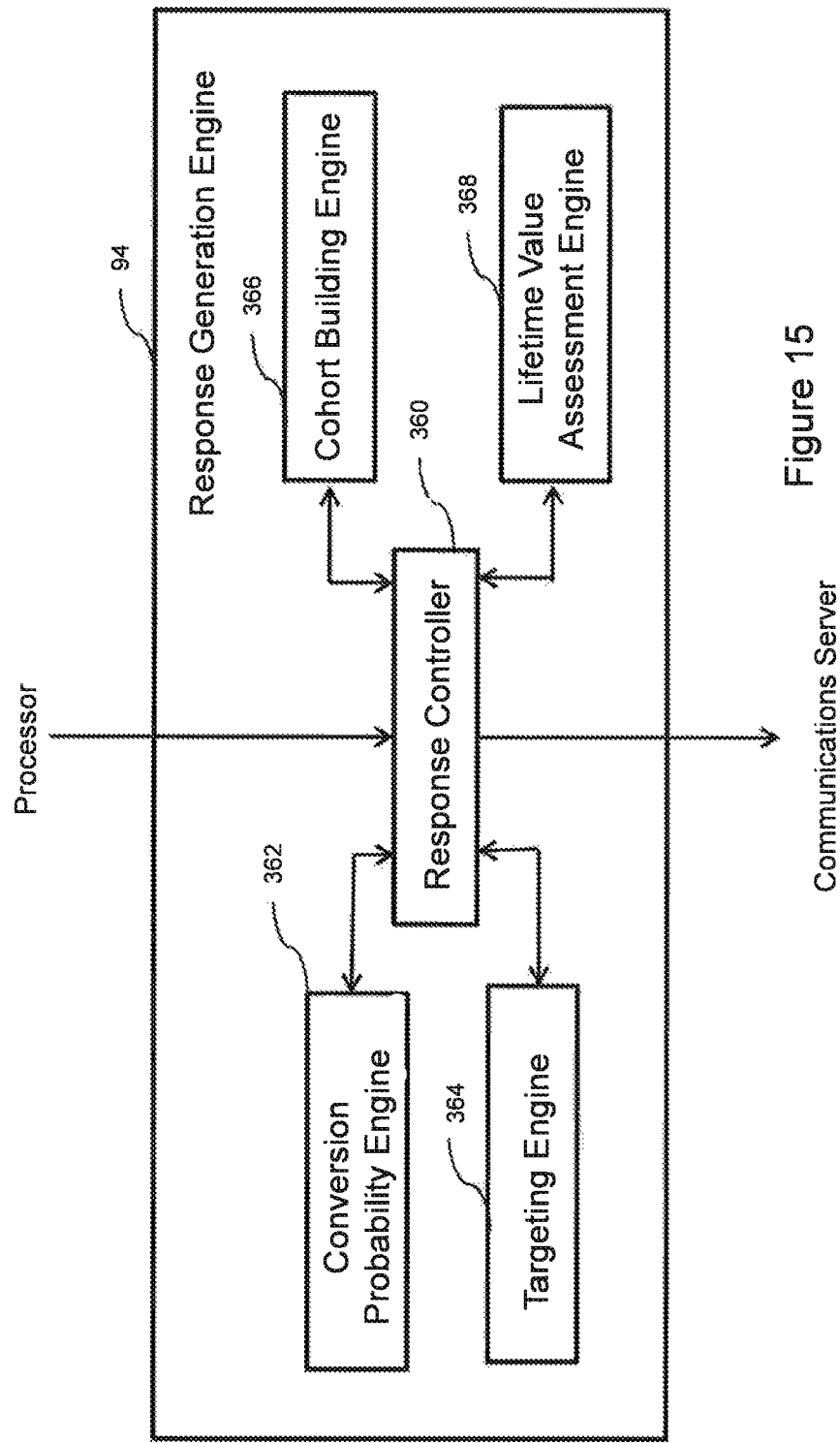
FIG. 15 is a schematic block diagram showing a Response Generation Engine of the QC Data Processing Platform of FIG. 3 in greater detail.

Having determined which model 92 best fits the current session data, the output of the Processor 90 is sent to the Response Generation Engine 94 where different types of analysis are carried out on the results. In particular, the Response Generation Engine 94 as shown in FIG. 15, comprises a Response Controller 360 which caries out the final analysis step 116. Several different types of analysis are possible some of these can be standard and other bespoke. However, these can generalised into four key areas each of which has a dedicated processing engine, namely Conversion Probability Engine 362 for determining a user's probability to convert, Targeting Engine 364 for determining which users to re-target, Cohort Building Engine 366 for building further user cohorts, and a Lifetime Value Assessment Engine 368 for determining if a current user relationship is still alive or dead, estimating the expected historic and future value of each user over a specific time period, or estimating the value of the current user base over a specific future period compared to the same period in the past.

In more detail, the predictive analysis of the Response Generation Engine 94 allow the clicks/actions of a user to be analysed and allows the QC Data Processing Platform 42 to predict the probability of whether that user will, or will not convert (namely make a purchase in this embodiment). In tests, it was proven using the present embodiment, possible to use the first 10 clicks of a user interaction in session data to predict their likelihood to purchase at a highly successful level.

By predicting an individual user's probability to convert, using machine learning, it is also possible to group users by this metric. This allows an understanding to be gained of who is very likely to convert, who is very unlikely to convert, and who is in the 'sweet-spot' where they require specific targeting to enhance the likelihood of their conversion.

The output to the Communications Server 80 can be in different forms. One form is a live dashboard, which is updated automatically when newly processed data is available. The attribution models 92 and standard insights generated by the Response Generation System 94 are able to change data on a daily basis, if data is being ingested on a daily basis.

Also as has been mentioned previously, the output of the Response Generation System 94 can also be a set of instructions to a website 12 to enable the website 12 to restructure and adjust the pages of the website to resolve any problems determined by the analysis of session data. In this regard, the QC data Processing Platform 42 can provide a control mechanism for monitoring, analysing and generating a feedback control command to adjust the configuration of the website 12 to overcome problems detected.

Finally, processed data is also available for collection from an API to allow re-ingestion to the website's own marketing and Analytics Platforms.

It is to be appreciated that the system can use identifiers from non-session data that coincides with session data provided to the system to further corroborate the identification of session data which has not been associated to linked session data. This can, at particular times, also strengthen the likelihood of this session data concerning the same individual.

It is also possible to use machine learning to detect identifying behaviours and segment users by these criteria. These would show key differentiations between family members, work colleagues, strangers on shared machines, etc. This in turn would allow the system to further stitch session data and identify non-matching sessions on the same devices.

The system can in some embodiments look for purchasing behaviour patterns using machine learning, which would apply to certain sectors using e-commerce platforms, and see how they translate to offline behaviours, to further define identifying factors of a user.

Having described the present invention with reference to several specific embodiments, it is to be appreciated that the skilled person will be capable of applying variations, modifications and/or additions other than those specifically described herein and it is to be understood that the present invention includes all such variations, modifications and/or additions, which fall within the spirit and scope of the following claims.

The invention claimed is:

1. A system for reconstructing browser interaction data from session data having incomplete tracking data, the system comprising:
   a data ingestion engine for ingesting data from a plurality of different data sources including an on-line user-interaction tracking source which provides the session data relating to different users' interaction with a website, some of the session data including tracking identifiers, and a non-interaction tracking source for providing non-session data relating to user activity other than session data;
   a data store for storing the ingested data;
   a data cleansing engine for cleansing the ingested data, the data cleansing engine comprising:
      a data re-evaluation engine for evaluating the non-session data and recovering user identifiers within the non-session data; and
      a path view building engine for linking together session data from different user interaction sessions to form linked session data using the tracking identifiers within the session data;
   wherein the data re-evaluation engine is arranged to compare the recovered user identifiers from the non-session data with user identifiers associated with the session data, and to associate any unlinked session data not previously linked with the linked session data, with linked session data which has an association via the recovered user identifiers,
   wherein the path view building engine is arranged to link together any unlinked session data with linked session data having an association via the recovered user identifiers,
   wherein the data cleansing engine is arranged to consider the session data and a plurality of predetermined dimensions and assign a plurality of dimensions to the session data matching that session data,
   the system further comprising a segmentation engine for grouping together the session data into segments based on the plurality of dimensions applied to that session data, wherein the segmentation engine is arranged to use combinations of dimensions which are associated with a particular type of data analysis,
   wherein the system is arranged to define a segment as a particular combination of dimensions and some of the plurality of dimensions as lossy, and the segmentation engine is arranged to combine the lossy dimensions to reduce the number of different combinations of segments to be considered by the segmentation engine, and
   wherein the segmentation engine is arranged to use historic session data to determine the historic probability of use of each segment, and the segmentation engine further comprises a table compression engine for creating a compressed table which combines together segments having a low historic probability of use as determined from the historic session data.

2. The system of claim 1, wherein the recovered user identifiers comprise a first and a second different user identifiers and the data re-evaluation engine is arranged to associate the first user identifier with the linked session data and the second user identifier with the unlinked session data.

3. The system of claim 1, wherein the recovered user identifier comprises a hashed user identifier.

4. The system of claim 3, wherein the data re-evaluation engine obtains a first user identifier from the session data and creates a hashed version of the first user identifier for comparison with the hashed recovered user identifier.

5. The system of claim 1, wherein the data re-evaluation engine determines the probability of some session data leading to a predetermined event, and removes some of the session data from the linked session data, if the probability is below a predetermined threshold.

6. The system of claim 1, wherein the session data or non-session data comprises messy data, the messy data having a data structure not matching a data structure known to the system, and the data cleansing engine is arranged to add structure to the messy data to enable the messy data to be understood by the system.

7. The system of claim 1, wherein the data cleansing engine is arranged to consider the session data received from the data ingestion engine and to generate an error signal for communication back to the website, if the number of errors exceeds a predetermined limit or the session data lacks sufficient structure to be considered.

8. The system of claim 1, wherein the data cleansing engine is arranged to review the historic session data to identify a plurality of dimensions to apply to the session data.

9. The system of claim 8, wherein the data cleansing engine comprises a neural network for comparing patterns of session data with patterns of historic session data associated with a known dimension, and assigning the known dimension to the session data where the corresponding patterns match.

10. The system of claim 1, wherein the session data comprises dimension information determined externally to the system and the data cleansing engine is arranged to replace externally-generated dimension information with one of more of the plurality of predetermined dimensions.

11. The system of claim 1, wherein the segmentation engine is arranged to apply the session data to the compressed table to correctly segment the session data using a plurality of dimensions.

12. The system of claim 1, wherein the data ingestion engine is arranged to ingest data from an analytics platform as clickstream data.

13. The system of claim 1, wherein the ingestion engine is arranged to ingest non-session data from a CRM platform, or a social media website or off-line data from a data store.

14. The system of claim 1, further comprising a processor for processing the cleaned and segmented data and an event prediction neural network, the processor being arranged to apply the cleaned and segmented data to the neural network to determine the likelihood of occurrence of a predetermined user interaction event with the web site.

15. A method of reconstructing browser interaction data from session data having incomplete tracking data, the method comprising:
ingesting data from a plurality of different data sources including an on-line user-interaction tracking source which provides the session data relating to different users' interaction with a website, some of the session data including tracking identifiers, and a non-interaction tracking source for providing non-session data relating to user activity other than session data;
storing the ingested data;
cleansing the ingested data, the cleansing step comprising:
evaluating the non-session data and recovering user identifiers within the non-session data; and
linking together session data from different user interaction sessions to form linked session data using the tracking identifiers within the session data;
wherein the evaluation step comprises comparing the recovered user identifiers from the non-session data with user identifiers associated with the session data and associating any unlinked session data not previously linked with the linked session data, to linked session data which has an association via the recovered user identifiers, and
the linking step comprises linking together any unlinked session data with linked session data having an association via the recovered user identifiers,
the method further comprising:
considering the session data and a plurality of predetermined dimensions and assigning a plurality of dimensions to the session data matching that session data,
grouping together the session data into segments based on the plurality of dimensions applied to that session data, comprising using combinations of dimensions which are associated with a particular type of data analysis,
defining a segment as a particular combination of dimensions and some of the plurality of dimensions as lossy, and combining the lossy dimensions to reduce the number of different combinations of segments to be considered by the segmentation engine,
using historic session data to determine the historic probability of use of each segment, and creating a compressed table which combines together segments having a low historic probability of use as determined from the historic session data.

16. A computer-readable storage medium comprising instructions which, when executed by a computer, cause the computer to:
ingest data from a plurality of different data sources including an on-line user-interaction tracking source which provides the session data relating to different users' interaction with a website, some of the session data including tracking identifiers, and a non-interaction tracking source for providing non-session data relating to user activity other than session data:
store the ingested data:
clean the ingested data, the cleansing step comprising:
evaluate the non-session data and recovering user identifiers within the non-session data; and
link together session data from different user interaction sessions to form linked session data using the tracking identifiers within the session data;
wherein the evaluation step comprises comparing the recovered user identifiers from the non-session data with user identifiers associated with the session data and associating any unlinked session data not previously linked with the linked session data, to linked session data which has an association via the recovered user identifiers, and
the linking step comprises linking together any unlinked session data with linked session data having an association via the recovered user identifiers,
wherein the instructions further cause the computer to:
consider the session data and a plurality of predetermined dimensions and assign a plurality of dimensions to the session data matching that session data,
group together the session data into segments based on the plurality of dimensions applied to that session data, comprising using combinations of dimensions which are associated with a particular type of data analysis,
define a segment as a particular combination of dimensions and some of the plurality of dimensions as lossy, and combine the lossy dimensions to reduce the number of different combinations of segments to be considered by the segmentation engine,
use historic session data to determine the historic probability of use of each segment, and create a compressed table which combines together segments having a low historic probability of use as determined from the historic session data.

* * * * *